United States Patent
Shula et al.

(10) Patent No.: US 12,492,731 B2
(45) Date of Patent: Dec. 9, 2025

(54) MULTIPLE STIFFNESS BRAKE ASSEMBLY

(71) Applicant: Honeywell International Inc., Charlotte, NC (US)

(72) Inventors: Brian Shula, South Bend, IN (US); William E Pajak, Chesterton, IN (US)

(73) Assignee: Honeywell International Inc., Charlotte, NC (US)

( * ) Notice: Subject to any disclaimer, the term of this patent is extended or adjusted under 35 U.S.C. 154(b) by 442 days.

(21) Appl. No.: 18/066,831

(22) Filed: Dec. 15, 2022

(65) Prior Publication Data
US 2024/0200624 A1  Jun. 20, 2024

(51) Int. Cl.
*F16D 65/12* (2006.01)
*F16D 55/36* (2006.01)
*B60T 1/06* (2006.01)
*F16D 65/02* (2006.01)

(52) U.S. Cl.
CPC ........... *F16D 65/123* (2013.01); *F16D 55/36* (2013.01); *B60T 1/065* (2013.01); *F16D 2065/1304* (2013.01); *F16D 2065/1368* (2013.01); *F16D 2250/0084* (2013.01)

(58) Field of Classification Search
CPC ............. F16D 55/36; F16D 2065/1368; F16D 65/123; F16D 2065/1364; F16D 65/186; F16D 2127/06; F16D 2069/0441; F16D 65/543; F16D 2127/10; F16D 65/0972; B60T 1/065; B60T 8/1703; B60T 1/005
See application file for complete search history.

(56) References Cited

U.S. PATENT DOCUMENTS

| | | | | |
|---|---|---|---|---|
| 2,441,140 A | * | 5/1948 | Fishburn | F16D 13/644 192/70.19 |
| 3,373,625 A | * | 3/1968 | Keller | F16D 3/06 74/438 |
| 3,754,624 A | * | 8/1973 | Eldred | F16D 65/84 188/264 G |
| 3,983,974 A | * | 10/1976 | Dowell | F16D 65/847 188/71.6 |
| 4,848,526 A | * | 7/1989 | Fargier | F16D 65/123 403/359.2 |

(Continued)

FOREIGN PATENT DOCUMENTS

| | | |
|---|---|---|
| EP | 1876372 A1 | 1/2008 |
| EP | 4253784 A1 | 10/2023 |

OTHER PUBLICATIONS

Extended Search Report from counterpart European Application No. 23212206.9 dated May 23, 2024, 5 pp.

(Continued)

*Primary Examiner* — Robert A. Siconolfi
*Assistant Examiner* — Mahbubur Rashid
(74) *Attorney, Agent, or Firm* — Shumaker & Sieffert, P.A.

(57) ABSTRACT

In some examples, a brake assembly includes a torque tube supporting a plurality of splines including a first spline and a second spline. The first spline has a first stiffness and the second spline has a second stiffness greater than the first stiffness. The braking system is configured such that, during a braking event and/or other relative motion between the stator disc and the torque tube, the first spline contacts the stator disc prior to the second spline, such that the first spline deflects and/or otherwise deforms before the stator contacts the second spline.

20 Claims, 12 Drawing Sheets

(56) References Cited

U.S. PATENT DOCUMENTS

| | | | | |
|---|---|---|---|---|
| 4,944,370 A | * | 7/1990 | Chambers | F16D 65/84 |
| | | | | 188/71.6 |
| 5,005,676 A | * | 4/1991 | Gassiat | F16D 65/123 |
| | | | | 188/218 XL |
| 5,291,852 A | * | 3/1994 | Allera | F16D 65/847 |
| | | | | 188/264 AA |
| 5,323,881 A | * | 6/1994 | Machan | F16D 55/36 |
| | | | | 188/18 A |
| 5,437,351 A | * | 8/1995 | Lindner | F16D 55/28 |
| | | | | 464/158 |
| 5,540,305 A | * | 7/1996 | Hammond | F16D 65/84 |
| | | | | 188/71.6 |
| 6,631,793 B2 | * | 10/2003 | Evrard | F16D 65/095 |
| | | | | 188/71.6 |
| 6,702,068 B1 | | 3/2004 | Riebe | |
| 8,616,345 B2 | * | 12/2013 | Rook | F16D 55/36 |
| | | | | 188/73.1 |
| 8,950,557 B2 | * | 2/2015 | Houser | F16D 55/36 |
| | | | | 192/70.2 |
| 10,145,429 B1 | | 12/2018 | Whittle | |
| 10,927,908 B2 | | 2/2021 | Steele et al. | |
| 11,320,010 B2 | | 5/2022 | Deng | |

OTHER PUBLICATIONS

Notice of Intent to Grant and Text Intended to Grant from counterpart European Application No. 23212206.9 dated Apr. 15, 2025, 102 pp.

\* cited by examiner

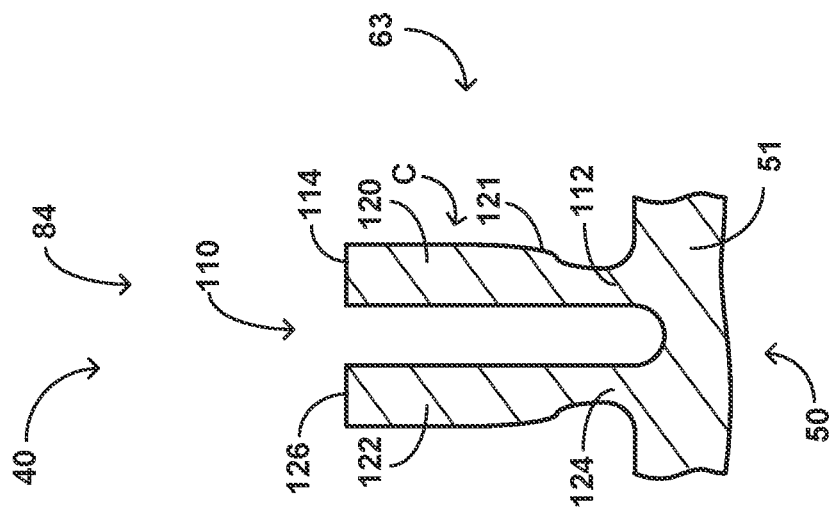
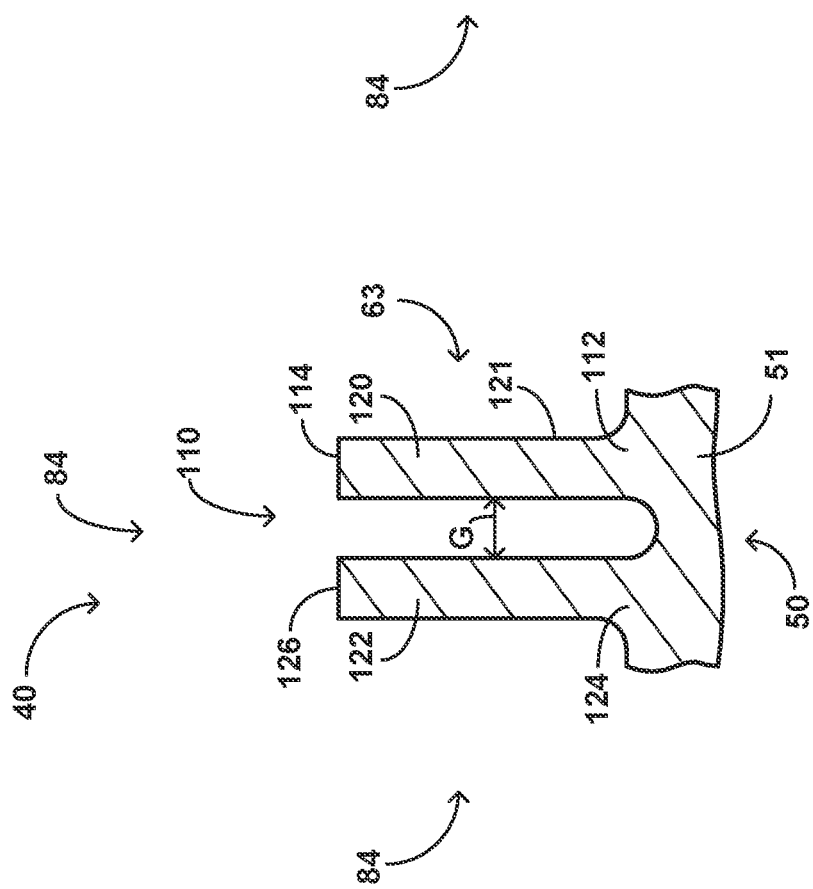

ial direction from the axis of the wheel; and a stiff spline extending from the body of the torque tube in a second radial direction from the axis of the wheel, wherein the second radial direction is different from the first radial direction, wherein the compliant spline and the stiff spline are configured to contact the stator disc to limit rotational movement of the stator disc relative to the torque tube when the torque tube extends through the aperture, wherein the compliant spline is configured to contact the stator disc prior to the stiff spline contacting the stator disc when the stator disc rotates relative to the torque tube and the torque tube extends through the aperture, wherein the compliant spline is configured to experience a first amount of deflection relative to the torque tube when the compliant spline contacts the stator disc and the stiff spline is configured to experience a second amount of deflection relative to the torque tube when the stiff spline contacts the stator disc, and wherein the first amount of deflection is greater than the second amount of deflection.
MULTIPLE STIFFNESS BRAKE ASSEMBLY

TECHNICAL FIELD

The present disclosure relates to brake systems of a vehicle.

BACKGROUND

Vehicles, such as aircrafts, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may compress the disc stack such that the rotating rotor discs engage the stationary stator discs, producing frictional forces between the rotor discs and the stator discs to decelerate the rotational motion of the wheel. In some examples, the stator discs are configured to engage one or more splines of a stationary torque tube surrounding the axle when the brake assembly compresses the disc stack. The engagement of the stator discs and the splines as the stators discs engage the rotor discs may produce stresses on the stator discs.

SUMMARY

The present disclosure describes articles, systems, and techniques relating to a brake assembly configured to decelerate a wheel. The brake assembly includes a torque tube supporting a plurality of splines. The plurality of splines are configured to receive forces (e.g., torques) from one or more stator discs during a braking event when the brake assembly decelerates the wheel. A first spline has a first stiffness and a second spline has a second stiffness different from the first stiffness. For example, the second stiffness is greater than the first stiffness. The braking system is configured such that, during the braking event, the first spline contacts the stator disc prior to the second spline, such that the first spline deflects and/or otherwise deforms before the stator contacts the second spline.

The deflection and/or deformation of the first spline may reduce a dynamic loading (e.g., an impact loading) on the first spline and/or the second spline as the stator disc contacts the first spline and/or the second spline. This reduction may reduce reaction forces caused by the dynamic loading and imparted to the stator disc by the first spline and/or the second spline. Hence, the brake assembly may be configured to reduce stresses on the stator disc caused by the reaction forces, The stress reduction may potentially increase an operating lifetime of the stator disc, allow a reduction in spline size, minimizing and/or eliminate a need for stator inserts, provide brake damping, and/or provide other beneficial outcomes.

In an example, a brake assembly comprises: a torque tube defining a wheel axis of a wheel, wherein the torque tube comprises a body and is configured to extend through an aperture defined by a stator disc; a first spline extending from the body of the torque tube; a second spline extending from the body of the torque tube, wherein the first spline and the second spline are configured to contact the stator disc to limit rotational movement of the stator disc relative to the torque tube when the torque tube extends through the aperture, wherein the first spline has a first stiffness and the second spline has a second stiffness greater than the first stiffness, and wherein the first spline is configured to contact the stator disc prior to the second spline contacting the stator disc when the stator disc rotates relative to the torque tube and the torque tube extends through the central aperture.

In an example, a brake assembly comprises: a torque tube defining a wheel axis of a wheel, wherein the torque tube is configured to extend through an aperture defined by a stator disc; a compliant spline extending from a body of the torque tube in a first radial direction from the axis of the wheel; and a stiff spline extending from the body of the torque tube in a second rad In an example, a method comprises: positioning a torque tube through an aperture defined by a stator disc, the torque tube defining a wheel axis of a wheel and comprising a body, wherein positioning the torque tube through the aperture comprises: positioning a first spline in a first stator slot defined by the stator disc, the first spline extending from the body of the torque tube; and positioning a second spline in a second stator slot defined by the stator disc, the second spline extending from the body of the torque tube, wherein the first spline and the second spline are configured to contact the stator disc to limit rotational movement of the stator disc relative to the torque tube when the torque tube extends through the aperture, wherein the first spline has a first stiffness and the second spline has a second stiffness greater than the first stiffness, and wherein the first spline is configured to contact the stator disc prior to the second spline contacting the stator disc when the stator disc rotates relative to the torque tube and the torque tube extends through the aperture.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a cross-sectional schematic view of a first example of a first spline, the cross-section being taken in a direction orthogonal to a wheel axis.

FIG. 8 is a cross-sectional schematic view of a second example of a first spline, the cross-section being taken in a direction orthogonal to a wheel axis.

DETAILED DESCRIPTION

Figure 1:
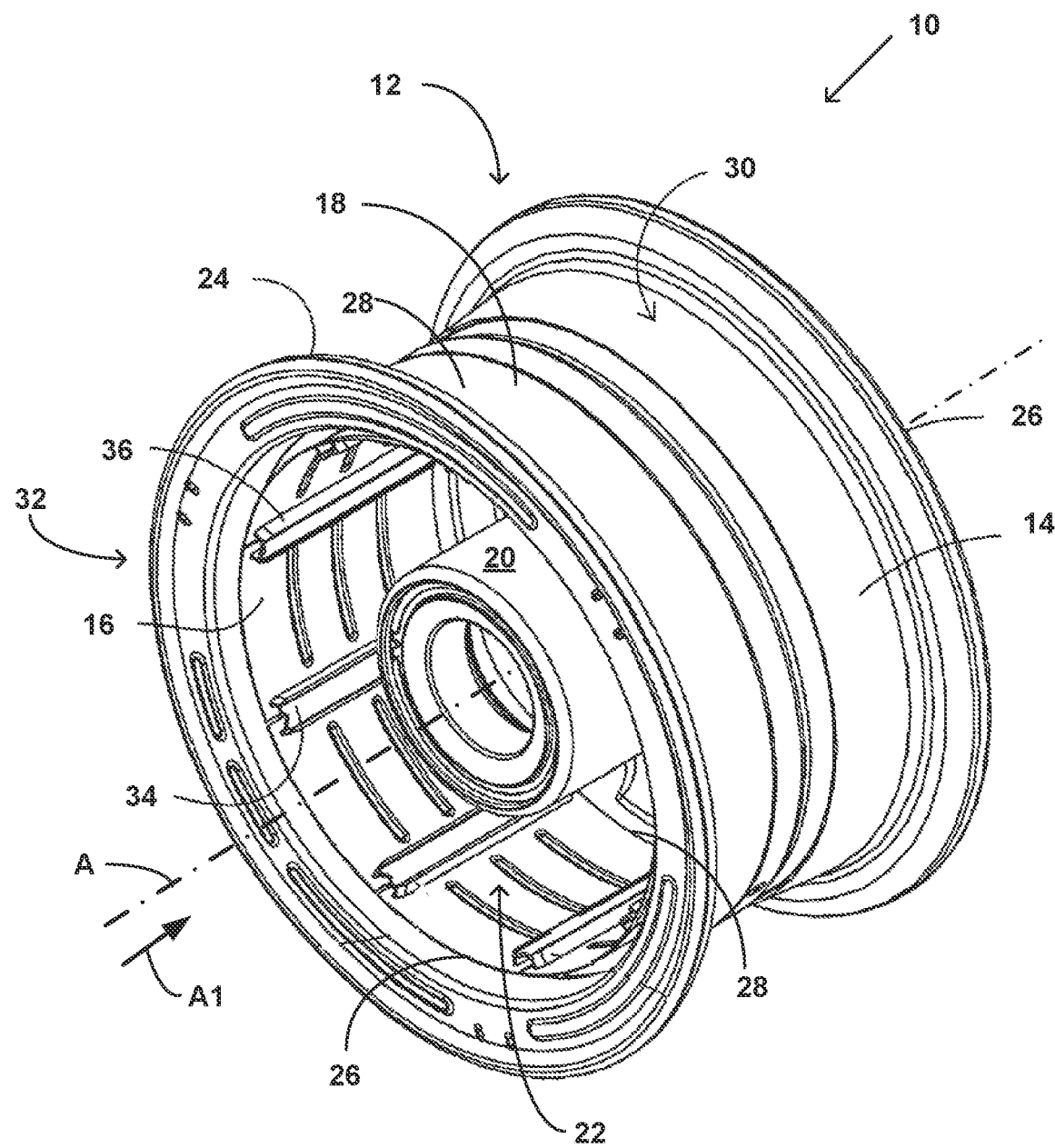
FIG. 1 is a perspective view illustrating an example wheel.

The disclosure describes articles, systems, and techniques relating to a brake system configured to decelerate a wheel configured to rotate about a wheel axis. The brake assembly includes a disc stack which includes one or more rotor discs interleaved with one or more stator discs. The rotor discs may be rotationally coupled with the wheel, such that a rotation of the wheel around the wheel axis causes rotation of the rotor discs around the wheel axis. The stator discs may be configured to engage one or more splines supported by a torque tube of the brake assembly, such that the stator discs remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

The engagement between one or more rotating rotor discs and a stator disc when the disc stack is compressed imparts a torque (e.g., around the wheel axis) on the stator disc. The torque may cause the stator disc to impart forces from the stator disc to the splines of the torque tube, resulting in the splines imparting corresponding reaction forces on the stator disc. The reaction forces from the splines generate stresses on the stator disc, causing stress load on the stator disc. In examples, the stator disc imparts a dynamic load (e.g., forces which vary over time) on the spline, resulting in relatively higher stresses on the stator disc for some period of time. For example, the higher stresses may result from impact between the stator and the splines when braking is initiated, vibrations of the brake assembly causing exchange of force between the stator disc and the splines, spline positional variations causing uneven loading among the splines, and/or result from other causes.

A reduction in the reaction forces imparted from the splines to the stator disc during a braking event may reduce the generated stresses on the stator disc. For example, reducing a magnitude of the higher reaction forces imparted from the splines during dynamic loading may reduce the generated stresses on the stator disc. The reduction in the generated stress may potentially increase the operating lifetime of the stator disc (e.g., increasing a number of landings per overhaul, which can include replacement of stator and/or rotors), minimize and/or eliminate a need for stator inserts, reduce a volume of brake disc material required for the stator disc, and/or provide other operating advantages.

In examples described herein, a brake assembly includes a torque tube supporting a plurality of splines. The brake assembly is configured to compress a disc stack to cause one or more stator discs to frictionally engage one or more rotor discs to, for example, cause the deceleration of a wheel. The plurality of splines are configured to engage the one or more stator discs to substantially maintain the stator discs rotationally stationary with respect to the torque tube as the rotor discs rotate with the wheel. The plurality of splines are configured to hold the one or more stator discs substantially rotationally stationary with respect to the torque tube as a torque imparts to the one or more stators discs (e.g., due to engagement with the rotor discs). For example, a torque (e.g., from one or more rotor discs) may be imparted on a stator disc causing a slight rotation of the stator disc relative to the torque tube (e.g., due to a clearance between the stator disc and the torque tube). The plurality of splines may contact the stator disc to substantially cease the rotation, holding the one or more stator discs substantially rotationally stationary with respect to the torque tube. The plurality of splines may be configured to transmit the torque generated on the stator discs from the stator discs to the torque tube.

The plurality of splines includes at least a first spline and a second spline. The first spline and the second spline are configured to reduce reaction forces imparted to a stator disc when the stator disc imparts forces to the first spline and the second spline (e.g., during a braking event). When a stator disc experiences a torque around a wheel axis (e.g., during a braking event), the first spline is configured to configured to contact the stator disc (e.g., contact a first stator slot of the stator disc) prior to the second spline contacting the stator disc (e.g., contacting a second stator slot of the stator disc). When the stator disc contacts and imparts a force to the first spline, the first spline is configured to deform (e.g., by bending or compression) prior to the stator disc contacting the second spline. The deformation of the first spline (e.g., a compliant spline) may absorb some portion of the kinetic energy of the stator disc as the stator disc contacts the first spline. The first spline may continue to deform (e.g., bend) while exerting a first reaction force against the stator disc as the stator disc subsequently makes contact with and begins to impart a force to the second spline (e.g., a stiff spline), causing the second spline to exert a second reaction force to the stator disc. The initial absorption of kinetic energy through deformation of the first spline may reduce the first reaction force and/or second reaction force that might have otherwise occurred in the absence of the deforming first spline, reducing generated stresses on the stator disc (e.g., reducing generated stresses on the first stator slot and/or second stator slot). For example, when the stator disc dynamically loads the torque tube by imparting an impulse (e.g., a force profile over a given time), deformation of the first spline may reduce the first reaction force of the first spline and/or the second reaction force of the second spline during an initial phase of the impulse, when the stator disc might impart relatively higher forces to the torque tube body (e.g., during initial contact between the stator disc and the torque tube). Hence, the deformation of the first spline may act to reduce higher stresses that might otherwise occur, such as during a dynamic loading (e.g., an impact loading and/or other loading) when the stator disc imparts an abrupt and/or uneven load to the first spline and/or the second spline.

In examples, the torque tube of the brake assembly defines a wheel axis of a wheel. The first spline and the second spline (and other splines in the plurality of splines) may be configured to allow one or more stator discs to translate axially (e.g., in a direction substantially parallel to the wheel axis) over the torque tube when the brake assembly compresses the disc stack to cause engagement of the rotor discs and the stator discs. In examples, the first spline is configured to extend radially outward from the torque tube in a first radial direction, and the second spline is configured to extend radially outward from the torque tube in a second radial direction different from the first radial direction. In examples, the torque tube is configured to extend through an aperture (e.g., a central aperture) defined by an inner perimeter of a stator disc. The first spline is configured to extend through a first stator slot defined on the inner perimeter of the stator disc and the second spline is configured to extend through a second stator slot defined on the inner perimeter of the stator disc when the torque tube extends through the aperture. The second stator slot is separate from and spaced from the first stator slot. The stator disc may be configured to impart a force to the first spline via the first stator slot and impart a force to the second spline via the second stator slot when the stator disc frictionally engages one or more rotating rotor discs. In examples, the first spline is configured such that the stator disc imparts a first force to the first spline via the first stator slot prior to the stator disc imparting a second force to the second spline via the second stator slot. The first spline may deform (e.g., by bending or compression) under the influence of the first force prior to the stator disc imparting the second force on the second spline.

The first spline has a first stiffness and the second spline has a second stiffness different from the first stiffness. In examples, the first stiffness is indicative of the resistance of the first spline to a deformation such as bending or compression (e.g., when the stator disc imparts force to the first spline, such as during a braking event) and the second stiffness is indicative of the resistance of the second spline to a deformation such as bending or compression (e.g., when the stator disc imparts force to the second spline, such as during the braking event). In some examples, the second stiffness is greater than the first stiffness. In some of these examples, the first spline is configured to experience a first amount of deformation (e.g., a first amount of bending and/or elastic deformation) when a stator disc exerts a specific amount of force on the first spline and the second spline is configured to experience a second amount of deformation (e.g., a second amount of bending and/or elastic deformation) when the stator disc exerts the specific amount of force on the second spline. The second amount of bending and/or elastic deformation may be less than the first amount of bending and/or elastic deformation.

Hence, the brake assembly includes a plurality of splines including at least a first spline and a second spline configured to reduce reaction forces imparted to a stator disc when the stator disc imparts forces to the first spline and the second spline, such as during a braking event. The reduction in the reaction forces imparted from the splines to the stator disc may reduce the generated stresses acting on the stator disc, such as generated stresses on one or more stator slots of the stator disc. The reduction in the generated stress may potentially increase the operating lifetime of the stator disc, minimize and/or eliminate a need for stator inserts, reduce a volume of brake disc material required for the stator disc, and/or provide other operating advantages.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of wheel rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A (also referred to herein as a wheel axis). An axial direction A1 of wheel 10 is parallel to the axis of rotation A and has a direction from inboard section 28 toward outboard section 30. In examples, the axial direction A1 is an outboard direction of wheel 10 and a direction opposite axial direction A1 is an inboard direction of wheel 10.

Wheel 10 includes a plurality of rotor drive keys 32 ("rotor drive keys 32") on interior surface 16 of wheel 10, such as rotor drive key 34 and rotor drive key 36. In some examples, each rotor drive key of the plurality of rotor drive keys 32 protrudes from interior surface 16 and extends in a substantially axial direction of wheel 10 (e.g., in a direction parallel to the axis of rotation A). Rotor drive keys 32 and interior surface 16 are configured to be substantially stationary with respect to each other, such that when wheel 10 (and interior surface 16) rotates around axis of rotation A, each of rotor drive keys 32 (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. As will be discussed, rotor drive keys 32 may be configured to receive a torque from a braking system (not shown) configured to reduce and/or cease a rotation of wheel 10. Rotor drive keys 32 may be integrally formed with interior surface 16, or may be separate from and mechanically affixed to interior surface 16.

Figure 2:
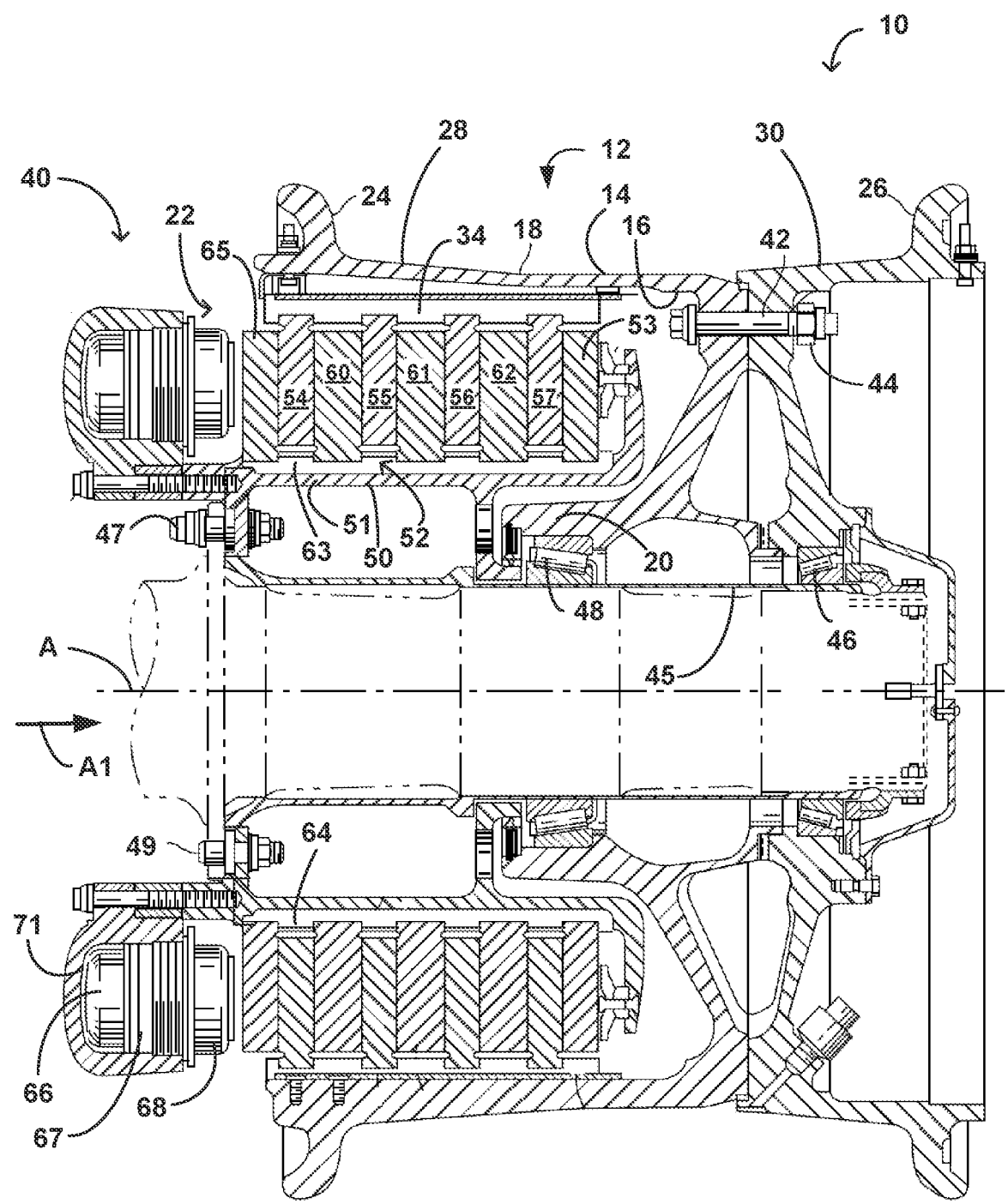
FIG. 2 is a schematic cross-sectional view illustrating an example wheel and brake assembly including the wheel of FIG. 1.

FIG. 2 is a schematic cross-sectional view illustrating wheel 10 and an example brake assembly 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples.

Wheel 10 is configured to rotate about axis A extending through axial assembly 45. Axial assembly 45 is figured to support wheel 10 while allowing wheel 10 to rotate around axis A using bearing 46 and bearing 48. For example, bearings 46, 48 may define a substantially circular track around axial assembly 45. A torque tube 50 is coupled to axial assembly 45. Torque tube 50 is configured such that a body 51 of torque tube 50 ("torque tube body 51") is substantially rotationally stationary relative to wheel 10 when wheel 10 rotates around axial assembly 45, torque tube 50, and/or axis A. Torque tube 50 may at least partially surround axis A. In examples, axial assembly 45 is configured to mechanically couple to a strut attached to a vehicle (e.g., a landing gear strut).

In the example shown in FIG. 2, brake assembly 40 is positioned within wheel 10 (e.g., positioned within wheel cavity 22) and configured to engage rotor drive key 34 (or a plurality of rotor drive keys). Brake assembly 40 is configured to generate a torque to oppose a rotation of wheel 10 around axis A and transfer the torque to rotor drive key 34, reducing and/or eliminating the rotation of wheel 10 around axis A. Brake assembly 40 includes a disc stack 52 which includes one or more rotor discs (e.g., rotor discs 54, 55, 56, 57) and one or more stator discs (e.g., stator discs 60, 61, 62). Rotor discs 54, 55, 56, 57, and/or stator discs 60, 61, 62 may have any suitable configuration. For example, rotor discs 54, 55, 56, 57 and/or stator discs 60, 61, 62 can each be substantially annular discs surrounding axial assembly 45. In examples, torque tube 50 is configured to extend through one or more apertures (e.g., aperture 72 (FIGS. 3-6)) defined by one or more of rotor discs 54, 55, 56, 57 and/or one or more of stator discs 60, 61, 62. In some examples, each of rotor discs 54, 55, 56, 57 and each of stator discs 60, 61, 62 respectively define an aperture (e.g., a central aperture) defined by an inner perimeter of the respective disc. Torque tube 50 may be configured to extend through each of the defined apertures. In examples, torque tube 50 is configured to extend through the one or more apertures substantially in an axial direction substantially parallel to the axis A (e.g., parallel or nearly parallel to the extent permitted by manufacturing tolerances) of wheel 10.

Rotor discs 54, 55, 56, 57 are configured to rotationally couple (e.g., using one or more rotor drive slots) to at least rotor drive key 34 and interior surface 16 to rotate substantially synchronously with wheel 10 around axis A. Stator discs 60, 61, 62 are configured to rotationally couple to torque tube 50 and at least a first spline 63 and a second spline 64 (e.g., using a plurality of stator slots) to remain substantially stationary with wheel 10 as wheel 10 rotates around axis A. First spline 63 and second spline 64 may be configured to substantially arrest a rotation of stator discs 60, 61, 62 to cause stator discs 60, 61, 62 to remain rotationally stationary with respect to torque tube 50 (and, e.g., axial assembly 45) as wheel 10 and rotor discs 54, 55, 56, 57 rotate.

An actuator 66 is configured to compress disc stack 52 to bring friction surfaces of rotor discs 54, 55, 56, 57 into contact with friction surfaces of stator discs 60, 61, 62, generating shearing forces between the discs. The shearing forces cause rotor discs 54, 55, 56, 57 to exert a torque on rotor drive key 34 opposing a rotation of wheel 10. The shearing forces further generate a torque on each of stator discs 60, 61, 62 around torque tube 50 and/or axis A, causing stator discs 60, 61, 62 to contact and impart a force on first spline 63 and force on second spline 64. For example, a torque on stator disc 60 (e.g., due to engagement with at least one of rotor disc 54 and/or rotor disc 55) may cause stator disc 60 to contact and impart a first force on first spline 63, and contact and impart a second force on second spline 64. In response, first spline 63 may exert a first reaction force on stator disc 60 and second spline 64 may exert a second reaction force on stator 60 to cause stator disc 60 to remain rotationally stationary with respect to torque tube 50 as wheel 10 rotates. The first reaction force imparted by first spline 63 and the second reaction force imparted by second spline 64 generate corresponding stresses on stator disc 60.

First spline 63 and second spline 64 are configured to reduce the generated stresses on a stator disc such as stator disc 60, 61, and/or 62. Stator disc 60 is primarily referred to herein for ease of description, but the discussion herein can also apply to one or more other stator discs of brake assembly 40. First spline 63 has a first stiffness and is configured to contact stator disc 60 prior to second spline 64 contacting stator disc 60 when first spline 63 and second spline 64 arrest and hold stator disc 60 substantially stationary with respect to torque tube body 51. Second spline 64 has a second stiffness greater than the first stiffness. In some examples, first spline 63 may be referred to as a compliant spline. Second spline 64 may be referred to as a stiff spline, which is more stiff than the complaint spline.

When stator disc 60 contacts and imparts a force to first spline 63 (e.g., due to shearing forces on stator disc 60), first spline 63 is configured to deform (e.g., by bending or compression) prior to stator disc 60 contacting second spline 64. The deformation of first spline 63 may absorb some portion of the kinetic energy of stator disc 60 as stator disc 60 contacts first spline 63. First spline 63 may continue to deform (e.g., bend) as stator disc 60 subsequently makes contact with and begins to impart a force to second spline 64. The initial deformation of first spline 63 may reduce the first reaction force from first spline 63 and/or the second reaction force from second spline 64 that might have otherwise occurred in the absence of a deforming first spline 63. The reduced first reaction force and/or second reaction force may reduce the stresses on stator disc 60. For example, the deformation of first spline 63 may act to reduce the generated stresses by damping forces (e.g., contact forces) that might occur when stator disc 60 imparts an abrupt and/or uneven load to first spline 63 and/or second spline 64. For example, when stator disc 60 dynamically loads torque tube body 51 by imparting an impulse (e.g., a force profile over a given time), deformation of the first spline 63 may reduce the first reaction force of first spline 63 and/or the second reaction force of second spline 64 during an initial phase of the impulse, when the force profile of the impulse may result in stator disc 60 imparting higher forces to torque tube body 51 (e.g., during initial contact between stator disc 60 and torque tube body 51).

In examples, first spline 63 extends radially outward from a body 51 of torque tube 50 torque tube in a first radial direction, and second spline 64 is configured to extend radially outward from the torque tube in a second radial direction different from the first radial direction. Although first spline 63 and second spline 64 are illustrated as displaced around torque tube 50 by about 180 degrees in FIG. 2, first spline 63 and second spline 64 may have any position on torque tube 50 relative to each other (e.g., less than 180 degrees, such as, but not limited to, 15 degrees to 165 degrees, such as 45 degrees to 90 degrees). In examples, first spline 63 and second spline 64 extend radially outward from torque tube body 51 in a radial direction substantially perpendicular to the axis A (e.g., perpendicular or nearly perpendicular to the extent permitted by manufacturing tolerances).

In some examples, actuator 66 is configured to compress disc stack 52 using a pressure plate 65. For example, actuator 66 may be configured to cause a piston 68 to translate relative to a body 67 of actuator 66 to compress disc stack 52. Actuator 66 may cause piston 68 to translate using any suitable method. In some examples, actuator 66 is configured to cause translation of piston 68 by supplying and/or venting a pressurized hydraulic fluid to or from a piston chamber. In addition or instead, in some examples, actuator 66 is configured to cause piston 68 to translate through a motion (e.g., a rotary motion) generated by an electric motor. In the example shown in FIG. 2, actuator 66 is configured to compress disc stack 52 against a backing plate 53.

A housing 71 is configured to partially or fully cover and/or protect one or more components of brake assembly 40, such as actuator body 67. Housing 71 may be configured to attach to torque tube 50 and/or another component of brake assembly 40 configured to remain substantially stationary with respect to torque tube 50. In some examples, housing 71 is configured to at least partially extend outside of wheel cavity 22 on a side of wheel 10 including inboard section 28 (e.g., an inboard side of wheel 10).

Wheel 10 may be used with any variety of private, commercial, or military aircraft or other type of vehicle. Wheel 10 may be mounted to a vehicle using, for example, bolt 47 and/or bolt 49, or some other fastening device. Axial assembly 45 may be mounted on a strut of a landing gear (not shown) or other suitable component of a vehicle to connect wheel 10 to the vehicle. Wheel 10 may rotate around axis A and axial assembly 45 to impart motion to the vehicle. Wheel 10 is shown and described to provide context to the brake assembly described herein, however the brake assembly described herein may be used with any suitable wheel assembly in other examples.

Figure 3:
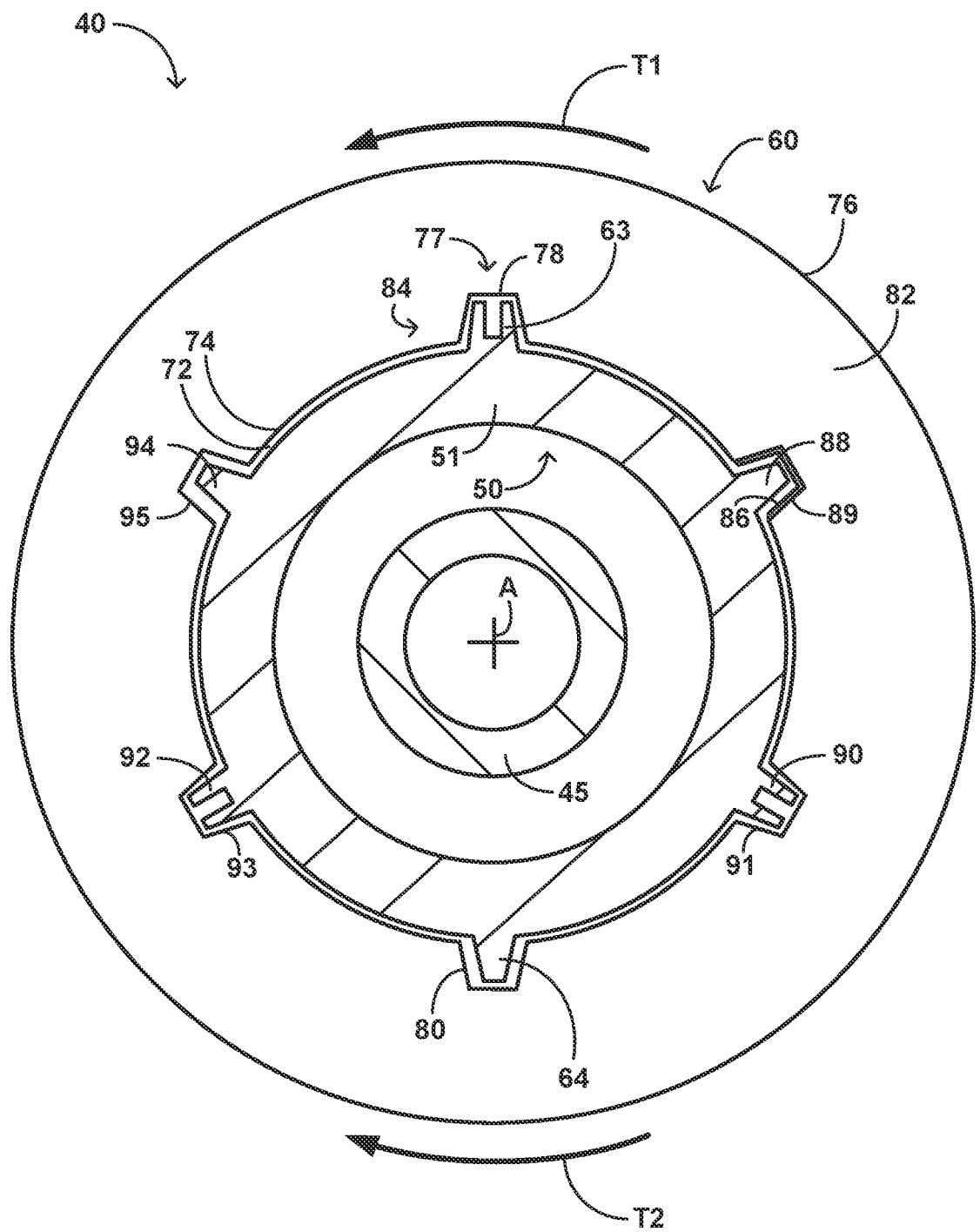
FIG. 3 is a cross-sectional schematic view illustrating an example stator disc and a torque tube, the cross-section being taken in a direction orthogonal to a wheel axis.

FIG. 3 is a schematic cross-sectional view illustrating torque tube 50 extending through an aperture 72 extending through stator disc 60, with the cross-section taken perpendicular to axis A. The description of stator disc 60 is applicable to the other stator discs of brake assembly 40. Stator disc 60 includes an inner perimeter 74 configured to surround axis A. In examples, inner perimeter 74 defines aperture 72. Stator disc 60 includes an outer perimeter 76 configured to surround inner perimeter 74. Stator disc 60 further defines a plurality of stator slots 77 ("stator slots 77") around inner perimeter 74, such as first stator slot 78 and second stator slot 80, as well as others similarly depicted. Stator disc 60 further includes friction surface 82 between inner perimeter 74 and outer perimeter 76. Stator disc 60 may include a second friction surface (not shown) opposite friction surface 82. Friction surface 82 and the second friction surface of stator disc 60 are configured to engage with adjacent rotor discs (e.g., at least one of rotor discs 54, 55 (FIG. 2)) during a braking operation of brake assembly 40.

In the example shown in FIG. 3, aperture 72 is configured to surround torque tube 50. In examples, aperture 72 is configured to receive torque tube 50 when torque tube 50 surrounds some portion of axial assembly 45. Stator slots 77 such as stator slot 78, 80 are configured to slidably receive a plurality of splines 84 ("splines 84") supported by torque tube 50, such as first spline 63, second spline 64, and others. In examples, stator disc 60 may include one or more stator inserts such as stator insert 86 configured to slidably engage a spline such as spline 88 when stator slots 77 slidably engage splines 84. Stator insert 86 may be configured to reduce and/or limit stresses imparted to stator disc 60 by spline 88, such as stresses imparted to a disc material (e.g., a carbon material and/or carbon-composite material) comprising stator disc 60. Stator disc 60 may define additional stator slots on inner perimeter 74, such as stator slot 89, stator slot 91, stator slot 93, and/or stator slot 95.

Torque tube body 51 is configured to support splines 84 such that splines 84 are substantially stationary (e.g., stationary or nearly stationary) with respect to torque tube body 51 (e.g., when wheel 10 rotates around axis A). Splines 84 may include additional splines, such as spline 88, spline 90, spline 92, and/or spline 94. Splines 84 are configured to extend through stator slots 77 such that stator disc 60 can translate relative to torque tube body 51. In examples, splines 84 are be configured to allow stator disc 60 to translate in an axial direction substantially parallel (e.g., parallel or nearly parallel to the extent permitted by manufacturing tolerances) to axis A.

Splines 84 may include one or more splines configured similarly to first spline 63 and/or second spline 64. For example, one or more of splines 88, 90, 92, 94 (e.g., splines 90, 92) may be an example of and/or configured similarly to first spline 63. One or more of splines 88, 90, 92, 94 (e.g., splines 88, 94) may be an example of and/or configured similarly to second spline 64. In examples, one or more of splines 84 is a unitary (e.g., substantially contiguous) component with torque tube body 51. In some examples, one or more of splines 84 is physically separate from and then affixed to torque tube body by welding, soldering, fasteners, adhesives, or other fixation methods.

During a braking operation, as wheel 10 rotates relative to torque tube body 51, when actuator 66 compresses disc stack 52 (FIG. 2), stator disc 60 may slidably translate over splines 84 to bring friction surface 82 into contact with a friction surface of one or more adjacent rotor discs (e.g. rotor disc 54 or rotor disc 55 (FIG. 2)) rotating synchronously with wheel 10. The engagement of friction surface 82 with an adjacent rotating rotor disc may impart a torque T1 or a torque T2 on stator disc 60 (e.g., around axis A), causing stator disc 60 to contact and impart a force to splines 84 (e.g., via stator slots 77). In response, splines 84 are configured to impart a reaction force against stator disc 60 to counteract torque T1 or torque T2 and maintain stator disc 60 substantially stationary with respect to torque tube body 51. The reaction forces imparted from splines 84 to stator disc 206 (e.g., via stator slots 77) generate stress load on stator disc 60.

Splines 84 are configured to reduce the generated stresses on stator disc 60 when splines 84 impart the reaction forces to stator 60. When, for example, splines 90, 92 are configured similarly to first spline 63 and splines 88, 94 are configured similarly to second spline 64, splines 84 are configured such that, when stator disc 60 experiences the torque T1, one or more of first spline 63, 90, 92 contacts stator disc 60 prior to one or more of second spline 64, 88, 94 contacting stator disc 60. First spline 63, 90, 92 are configured to deform (e.g., by bending or compression) as stator disc 60 subsequently makes contact with and begins to impart a force to second spline 64, 88, 94. The initial deformation of first spline 63, 90, 92 may act to reduce the reaction forces from splines 84 to stator disc 60, reducing the stresses on stator disc 60 (e.g., stresses generally localized on one or more of stator slots 78, 89, 91, 80, 93, 95).

Figure 4:
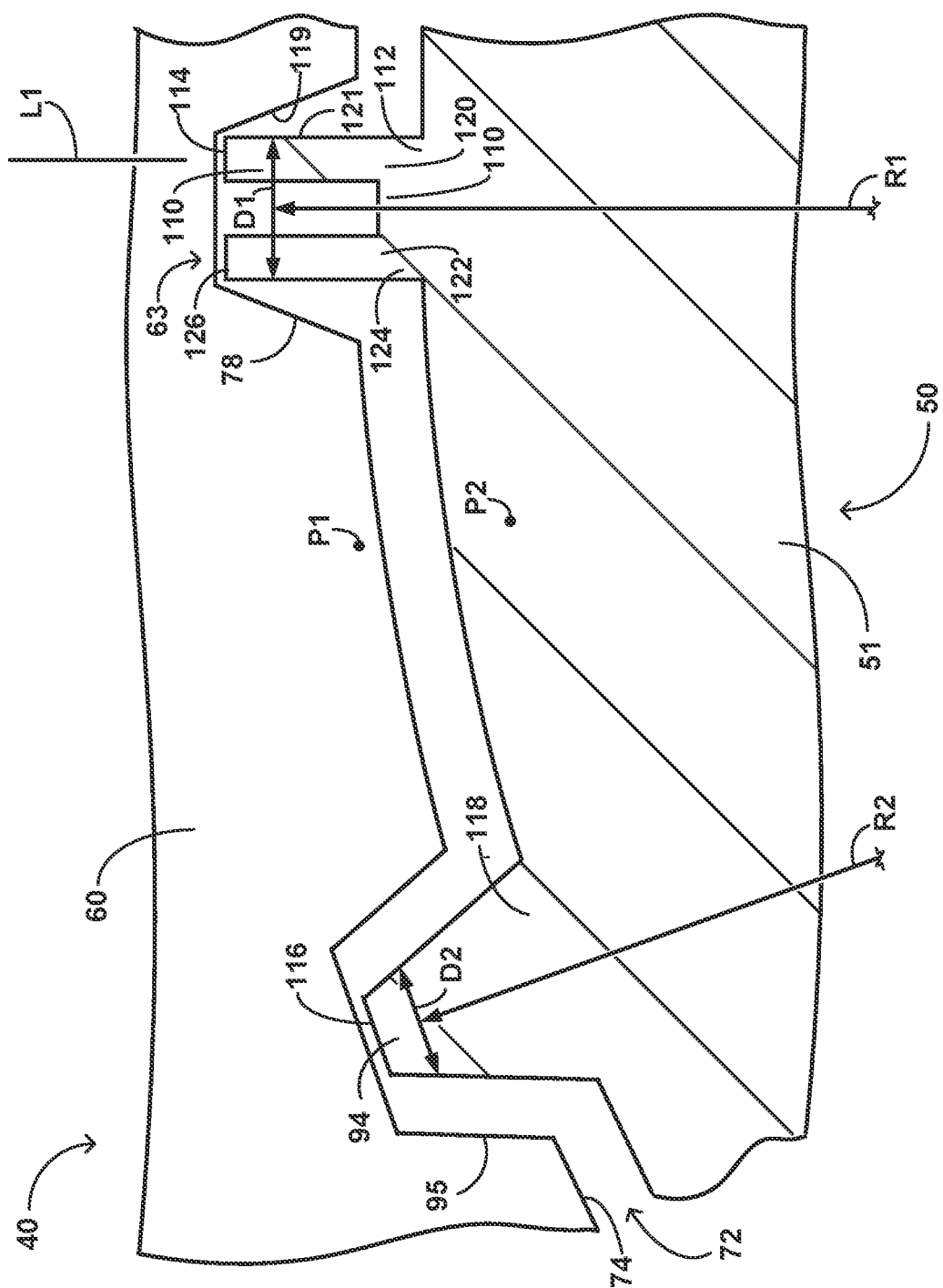
FIG. 4 is a cross-sectional schematic view of part of an example torque tube in an unloaded condition, the cross-section being taken in a direction orthogonal to a wheel axis.
Figure 5:
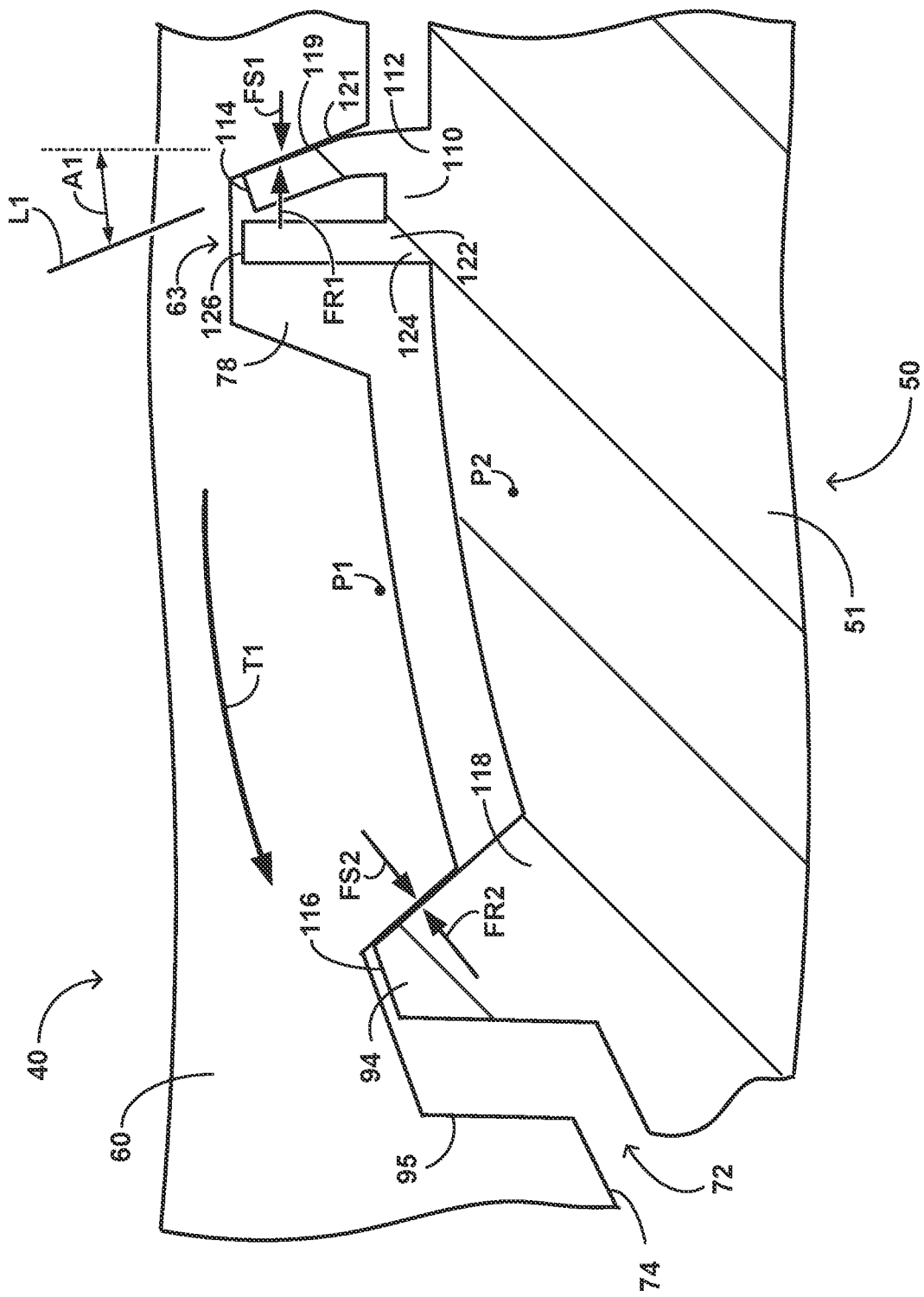
FIG. 5 is a cross-sectional schematic view of the torque tube of FIG. 4 loaded by a first torque on the stator disc of FIG. 4.
Figure 6:
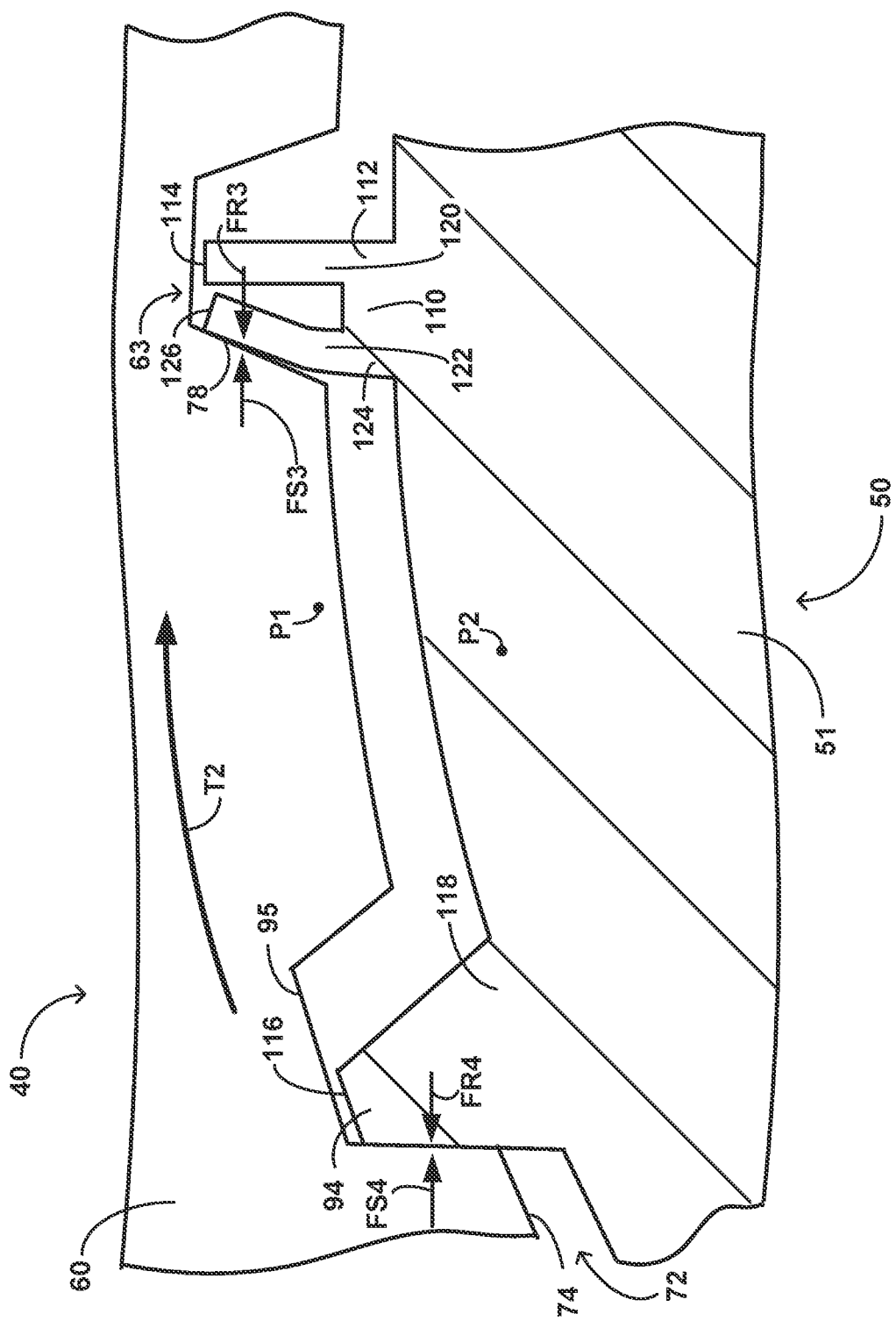
FIG. 6 is a cross-sectional schematic view of the torque tube of FIG. 4 and FIG. 5 loaded by a second torque on the stator disc of FIG. 4 and FIG. 5.

For example, FIG. 4, FIG. 5, and FIG. 6 are schematic cross-sectional views illustrating an example portion of torque tube 50 and an example portion of stator disc 60, with the cross-section taken perpendicular to axis A. Torque tube 50 extends through aperture 72 defined by stator disc 60, with first spline 63 extending through stator slot 78 and second spline 94 extending through stator slot 95. FIG. 4 depicts stator disc 60 experiencing minimal or substantially no torque around axis A, such as might occur when, for example, disc stack 52 (FIG. 2) is in a substantially uncompressed condition. Torque tube 50 is in a substantially unloaded condition in FIG. 4 (e.g., substantially unloaded by a torque imparted from stator disc 60). FIG. 5 depicts stator disc 60 experiencing the torque T1, such as might occur when, for example, disc stack 52 (FIG. 2) is compressed to cause stator disc 60 to engage with rotor discs 54, 55 (e.g., when wheel 10 is rotating in a first rotational direction about axis A). FIG. 6 depicts stator disc 60 experiencing the torque T2, such as might occur when disc stack 52 is compressed to cause stator disc 60 to engage with rotor discs 54, 55 (e.g., when wheel 10 is rotating in a second rotational direction about axis A opposite the first rotational direction). Torque tube 50 is in a loaded condition in FIG. 5 and FIG. 6, such that torque tube 50 holds stator disc 60 substantially stationary with respect to torque tube body 51 as stator disc 60 imparts some portion of the torque T1 or the torque T2 to torque tube 50. For example, torque tube 50 may hold stator disc 60 substantially stationary with respect to torque tube body 51 subsequent to a partial rotation of stator disc 60 relative to torque tube body 51 caused by torque T1 or torque T2 (e.g., due to clearance between stator disc 60 and first spline 63 and/or second spline 94).

As shown in FIG. 5, first spline 63 is configured to contact stator disc 60 prior to second spline 94 contacting stator disc 60 when stator disc 60 moves relative to torque tube body 51. For example, first spline 63 is configured to contact stator disc 60 before second spline 94 when the torque T1 causes stator disc 60 (e.g., a fixed point P1 of stator disc 60) to move relative to torque tube body 51 (e.g., relative to a fixed point P2 of torque tube body 51). As stator disc 60 contacts and imparts a force FS1 on first spline 63, first spline 63 is configured to deform, e.g., by bending or compression (as illustrated in FIG. 5). The deformation of first spline 63 may absorb some portion of the kinetic energy of stator disc 60 as stator disc 60 contacts first spline 63. The deformation of first spline 63 may reduce a first reaction force FR1 imparted to stator disc 60 from first spline 63 in response to the force FS1, reducing stresses on stator disc 60 (e.g., stator slot 78).

First spline 63 may continue to deform (e.g., bend) while exerting first reaction force FR1 against stator disc 60 as stator disc 60 subsequently makes contact with and begins to impart a force FS2 to second spline 94, causing second spline 94 to exert a second reaction force FR2 to stator disc 60. First spline 63 is configured such that the deformation of first spline 63 acts to reduce the second reaction FR2 compared to if splines 63, 64 were substantially identically configured (e.g., identical but for manufacturing variances), reducing stresses on stator disc 60 (e.g., stator slot 109). For example, the first spline 63 may reduce the first reaction force FR1 and the second reaction force FR2 by absorbing some amount of momentum from stator disc 60 through deformation, causing a reduction in the first reaction force FR1 and/or the second reaction force FR2. In particular, when stator disc 60 dynamically loads torque tube body 51 by imparting an impulse (e.g., a force profile over a given time), deformation of the first spline 63 may reduce the first reaction force FR1 and/or the second reaction force FR2 during an initial phase of the impulse, when the force profile may result in stator disc 60 imparting higher forces to torque tube body 51 (e.g., during initial contact between stator disc 60 and torque tube body 51).

In examples, first spline 63 is configured to deform by bending when stator disc 60 imparts force FS1 on first spline 63. For example, first spline 63 may include a body 110 ("first spline body 110") defining a fixed end 112 supported by torque tube body 51 and a free end 114 opposite fixed end 112. First spline 63 may define a spline axis L1 extending through fixed end 112 and free end 114. First spline 63 may be configured such that spline axis L1 has a first orientation with respect to torque tube body 51 when torque tube 50 is in an unloaded condition (e.g., as depicted at FIG. 4). In some of these examples, first spline 63 is configured to bend when stator disc 60 imparts force FS1, such that spline axis L1 has a second orientation with respect to torque tube body 51 different from the first orientation (as depicted at FIG. 5). For example, first spline 63 may be configured to bend to cause spline axis L1 to angularly displace by an angle A1 when spline axis L1 transitions between the first orientation and the second orientation. In examples, first spline 63 is configured to bend to cause free end 114 to move relative to fixed end 112 when stator disc 60 imparts force FS1 on first spline 63.

Torque tube 50 is configured such that first spline 63 has a first stiffness and second spline 94 has a second stiffness. The first stiffness may be indicative of the resistance of first spline 63 to a deformation such as bending or compression when stator disc 60 imparts a force to first spline 63. The second stiffness may be indicative of the resistance of second spline 94 to a deformation such as bending or compression when stator disc 60 imparts a force to second spline 94. In some examples, the second stiffness of second spline 94 is greater than the first stiffness of first spline 63. In examples, first spline 63 has a first stiffness such that first spline 63 experiences a first amount of deformation (e.g., a first deflection such as an angular displacement over the angle A1, and/or a first amount of compression) when the first force FS1 is equal to a specific magnitude of force. Second spline 94 may have a second stiffness such that second spline 94 experiences a second amount of deformation (e.g., a second deflection over a second angular displacement, and/or a second amount of compression) when the second force FS2 is equal to the specific magnitude of force. In examples in which the second stiffness is greater than the first stiffness, second spline 94 is configured such that the second amount of deformation is less than the first amount of deformation.

In some examples, the first deformation refers to a deformation measured along an axis perpendicular to a first radius R1 (FIG. 4) originating at axis A (FIGS. 1-3) and extending at least to first spline 63 and the second deformation refers to a deformation measured along an axis perpendicular to a second radius R2 (FIG. 4) originating at axis A and extending at least to second spline 94. In examples, first radius R1 and/or second radius R2 are substantially perpendicular to axis A (e.g., perpendicular or nearly perpendicular to axis A to the extent permitted by manufacturing tolerances). In some examples, the first stiffness is a bending stiffness indicative of the resistance of first spline 63 to a bending deformation causing a displacement of free end 114 relative to fixed end 112 (e.g., when stator 60 causes first spline 63 to angularly displace over the angle A1). In some examples, the second stiffness is a bending stiffness indicative of the resistance of second spline 64 to a bending deformation causing a displacement of a free end 116 of second spline 64 relative to a fixed end 118 of second spline 94.

In some examples, first spline 63 defines a first dimension D1 and second spline 94 defines a second dimension D2, with first dimension D1 and second dimension D2 configured to cause first spline 63 to contact stator disc 60 prior to second spline 94 contacting stator disc 60. First dimension D1 may be, for example, a cross-sectional dimension of first spline 63, the cross-section being take in a direction orthogonal to axis A. Second dimension D2 may be a cross-sectional dimension of second spline 94, the cross-section being take in a direction orthogonal to axis A. In examples, first dimension D1 is a displacement perpendicular to first radius R1 and second dimension D2 is a displacement substantially perpendicular to second radius R2. In examples, first radius R1 is substantially equal to second radius R2 (e.g., equal or nearly equal to the extent permitted by manufacturing tolerances).

In examples, as illustrated in FIG. 6, first spline 63 is configured to contact stator disc 60 when stator disc 60 moves relative to torque tube body 51 in the first rotational direction or in the second rotational direction opposite the first rotational direction. For example, first spline 63 may be configured to contact stator disc 60 before second spline 64 contacts stator disc 60 when the torque T2 causes stator disc 60 (e.g., fixed point P1 on stator disc 60) to move relative to torque tube body 51 (e.g., relative to fixed point P2 on torque tube body 51). As stator disc 60 contacts and imparts a force FS3 on first spline 63, first spline 63 is configured to deform, e.g., by bending or compression to, for example, absorb some portion of the kinetic energy of stator disc 60 as stator disc 60 contacts first spline 63. The deformation of first spline 63 may reduce a first reaction force FR3 imparted to stator disc 60 from first spline 63 in response to a force FS3 imparted by stator 60 on first spline 63, and/or reduce a second reaction force FR4 imparted to stator disc 60 from second spline 64 in response to a force FS4 imparted by stator 60 on second spline 64. For example, when stator disc 60 dynamically loads torque tube body 51 by imparting an impulse (e.g., a force profile over a given time), deformation of the first spline 63 may reduce the third reaction force FR3 and/or the fourth reaction force FR4 during an initial phase of the impulse, when the force profile may result in stator disc 60 imparting higher forces to torque tube body 51 (e.g., during initial contact between stator disc 60 and torque tube body 51).

In examples, a plurality of stator discs (e.g., each of stator disc 60, stator disc 61, and stator disc 62) each define an aperture defined by an inner perimeter of each of the plurality of stator discs. Torque tube 50 (e.g., torque tube body 51) may be configured to extend through the aperture defined by each of the plurality of stator discs. In examples, first spline 63 is configured to contact each individual stator disc in the plurality of stator discs prior to second spline 64 contacting the each individual stator disc.

In some examples, first spline 63 may be configured to be displaced from stator 60 when torque tube 50 is in the substantially unloaded condition (e.g., substantially unloaded by a torque imparted from stator disc 60, as depicted by FIG. 4), although this is not required. In other examples, first spline 63 is in contact with stator disc 60 when torque tube 50 is in the substantially unloaded condition. In some examples, first spline 63 is configured to be in contact with stator disc 60 to, for example, establish a pre-load on stator disc 60. For example, first spline 63 may be configured to impart a force on stator disc 60 (e.g., stator slot 78) when torque tube 50 is in the substantially unloaded condition. In some examples, first spline 63 may be configured to establish a sliding engagement with stator disc 60 when torque tube 50 is in the substantially unloaded condition.

First spline 63 (e.g., first spline body 110) may have any suitable configuration sufficient to cause a deformation of first spline body 110 when stator disc 60 imparts a force (e.g., force FS1 and/or force FS2) to first spline 63. FIGS. 7-13 illustrate examples configurations of first spline 63. In examples, as illustrated in FIG. 7, first spline body 110 comprises a first spline portion 120 and a second spline portion 122 extending radially outward from torque tube body 51. First spline portion 120 defines fixed end 112 and free end 114. Second spline portion 122 defines a fixed end 124 supported by torque tube body 51 and a free end 126 opposite fixed end 124. FIG. 7 is a schematic cross-sectional view illustrating first spline portion 120, second portion 122, and a portion of torque tube 50 with the cross-section taken perpendicular to axis A (FIGS. 1-3).

In examples, first spline body 110 is configured such that first spline portion 120 is displaced (e.g., separated) from second spline portion 122 by a gap G. First spline body 110 may be configured such that gap G separates some portion of first spline portion 120 between fixed end 112 and free end 114 and some portion of second spline portion 122 between fixed end 124 and free end 126. Gap G may extend between first spline portion 120 and second spline portion 122 in a tangential direction of torque tube 50. The tangential direction of torque tube 50 may be a direction perpendicular to first radius R1 or first radius R2 and perpendicular to axis A (e.g., perpendicular or nearly perpendicular to first radius R1 or second radius R2 and perpendicular or nearly perpendicular axis A to the extent permitted by manufacturing tolerances). First spline body 110 may be configured such that gap G extends in an axial direction (e.g., substantially parallel to axis A (FIGS. 1-3)).

In examples, first spline portion 120 is configured to contact stator disc 60 when stator disc 60 experiences the torque T1 and imparts force FS1 to first spline body 110. First spline portion 120 may be configured to deform (e.g., by bending and/or compression) when stator disc 60 imparts force FS1 on first spline body 110 (as depicted in FIG. 5). In examples, first spline body 110 is configured such that second spline portion 122 does not contact stator disc 60 when first spline portion 120 deforms due to force FS1. Second spline portion 122 may be configured to contact stator disc 60 when stator disc 60 experiences the torque T2 and imparts force FS3 to first spline body 110. Second spline portion 122 may be configured to deform (e.g., by bending and/or compression) when stator disc 60 imparts force FS2 on first spline body 110 (as depicted in FIG. 6). In examples, first spline body 110 is configured such that first spline portion 120 does not contact stator disc 60 when second spline portion 122 deforms due to force FS2. The deformation of first spline portion 120 and/or second spline portion 122 may, for example, absorb some portion of the kinetic energy of stator disc 60 as stator disc 60 contacts first spline body 110.

In examples, first spline body 110 is configured such that gap G allows a part of first spline portion 120 (e.g., free end 114) to move substantially independently of a part of second spline portion 122 (e.g., free end 126). For example, gap G may define an open space (e.g., an air gap) between first spline portion 120 and second spline portion 122, such that a force (e.g., force FS1) imparted to first spline portion 120 is not transmitted to second spline portion 122 unless first spline portion 120 bends or otherwise deforms such that first spline portion 120 contacts second spline portion 122.

In some examples, first spline body 110 is configured such that gap G limits and/or prevents contact between first spline portion 120 and second spline portion 122 when stator disc 60 imparts force FS1 or force FS2. For example, first spline body 110 may define gap G such that stator disc 60 contacts second spline 64, 88, 94 (FIG. 3) prior to first spline portion 120 contacting second spline portion 122 (e.g., prior to first spline portion 120 deforming and/or bending across the gap G). Contact of stator disc 60 and second spline 64, 88, 94 may substantially cease movement of stator disc 60 relative to torque tube body 51, such that first spline portion 120 remains displaced from second spline portion 122. Hence, in some examples, first spline 63 may be configured such that a first portion of spline body 110 (e.g., first spline portion 120) may move substantially independently of a second portion of spline body 110 (e.g., second spline portion 122) when stator disc 60 imparts force FS1 or force FS2 to first spline 63.

Although two spline portions are shown in FIG. 7, in other examples, first spline body 110 includes additional spline portions configured similarly to first spline portion 120 and/or second spline portion 122. First spline body 110 may be configured such that one or more of the additional spline portions is displaced from one or more other spline portions by a gap similar to gap G when torque tube 50 is in the unloaded condition (e.g., when stator disc 60 is not imparting force FS1 or FS 2 to first spline body 110. The gaps G between the adjacent splines can be substantially the same (e.g., equal but for manufacturing tolerances) or can differ between different sets of adjacent spline portions of first spline 110.

In examples, first spline 63 is configured to increase a contact area (e.g., a contact area apparent) with stator disc 60 when stator disc 60 exerts force FS1 on first spline 63. The contact area may be, for example, a surface area defined by first spline 63 which is in contact with stator disc 60. First spline 63 may be configured to increase the contact area as stator disc 60 exerts force FS1 on first spline 63. For example, first spline 63 may be configured to increase the contact area as first spline 63 deforms (e.g., bends) in response to force FS1 imparted by stator disc 60. In examples, first spline 63 is configured to impart first reaction force FR1 on stator disc 60 via the contact area, such that first spline 63 substantially distributes first reaction force FR1 over the contact area. First spline 63 may be configured to increase the contact area to distribute first reaction force FR1 over a larger area, potentially reducing the resultant stress on stator disc 60.

For example, with reference to FIGS. 4 and 5, stator disc 60 may be configured to impart force FS1 to first spline 63 via at least some portion of a stator area 119 defined by stator slot 78. In examples, stator area 119 is an area defined by stator slot 78. First spline 63 may be configured to receive force FS1 from stator 60 and/or impart first reaction force FR1 to stator 60 via at least some portion of a spline area 121 defined by first spline 63. The contact area defined by first spline 63 may be the portion of spline area 121 (also referred to herein as a spline surface area) in contact with stator area 119. First spline 63 may be configured to increase the portion of spline area 121 in contact with stator area 119 as stator disc 60 exerts force FS1 on first spline 63. First spline 63 may be configured to increase the portion of spline area 121 in contact with stator area 119 as first spline 63 deforms (e.g., bends, for example over the angle A1 (FIG. 5)) in response to force FS1.

For example, FIG. 8 illustrates an example first spline body 110 configured to increase the contact area with stator disc 60 as stator disc 60 causes a deformation (e.g., a bending) of first spline body 110. FIG. 8 is a schematic cross-sectional view illustrating first spline body 110 and a portion of torque tube 50 with the cross-section taken perpendicular to axis A (FIGS. 1-3). First spline body 110 (e.g., first spline portion 120 and/or second spline portion 122) may be configured such that spline area 121 defines a curvature configured to increase the contact area as stator disc 60 causes the deformation of first spline body 110. For example, spline area 121 may be configured to define a curvature C between fixed end 112 and free end 114. In examples, curvature C is configured to limit and/or otherwise reduce shearing and/or slippage between spline area 121 and stator area 119 as stator disc 60 moves relative to torque tube body 51 and imparts force FS1 on first spline body 110. For example, spline area 121 may define curvature C such that spline area 121 gradually conforms to stator area 119 as stator disc 60 moves relative to torque tube body 51 and causes the deformation of first spline body 110.

In some examples, first spline 63 (e.g., first spline body 110) defines a first member extending from torque tube body 51 and a second member attached at least to the first member. The first member and second member may be configured such that the first stiffness of first spline body 110 is dependent on a respective stiffness of the first member and the second member, and/or a relative configuration of the first member and the second member. For example, first spline body 110 may be configured such that a force (e.g., force FS1 or force FS2) imparted by stator disc 60 on first spline 63 is transmitted to both the first member and the second member, such that the response of first member and the response of the second member defines the first stiffness of first spline 63 in response to the force.

Figure 11:
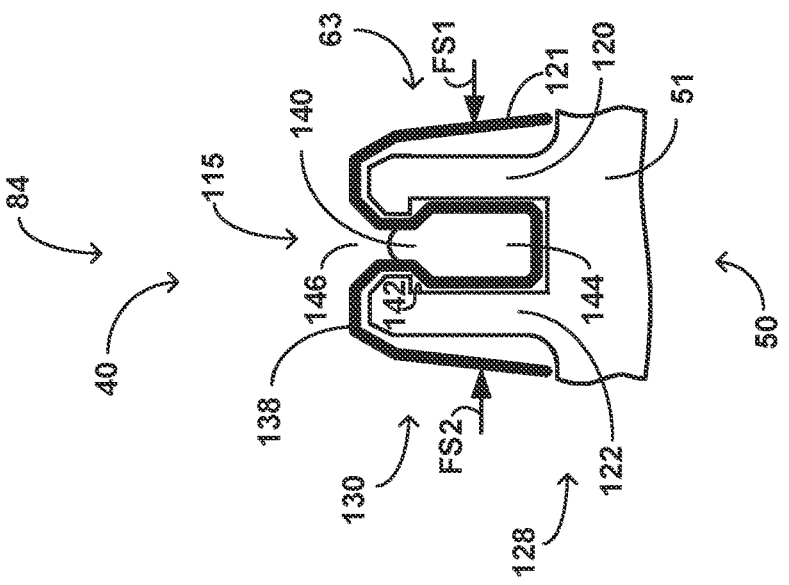
FIG. 11 is a cross-sectional schematic view of a fifth example of a first spline, the cross-section being taken in a direction orthogonal to a wheel axis.
Figure 10:
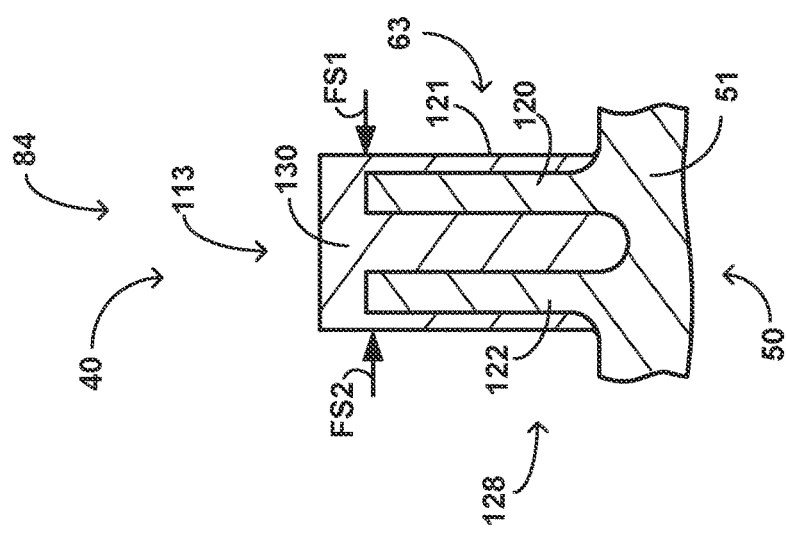
FIG. 10 is a cross-sectional schematic view of a fourth example of a first spline, the cross-section being taken in a direction orthogonal to a wheel axis.
Figure 9:
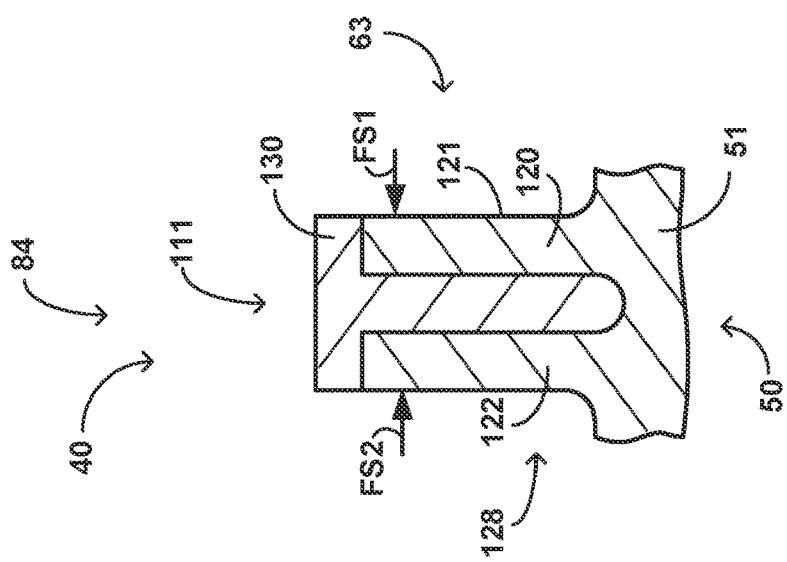
FIG. 9 is a cross-sectional schematic view of a third example of a first spline, the cross-section being taken in a direction orthogonal to a wheel axis.
Figure 13:
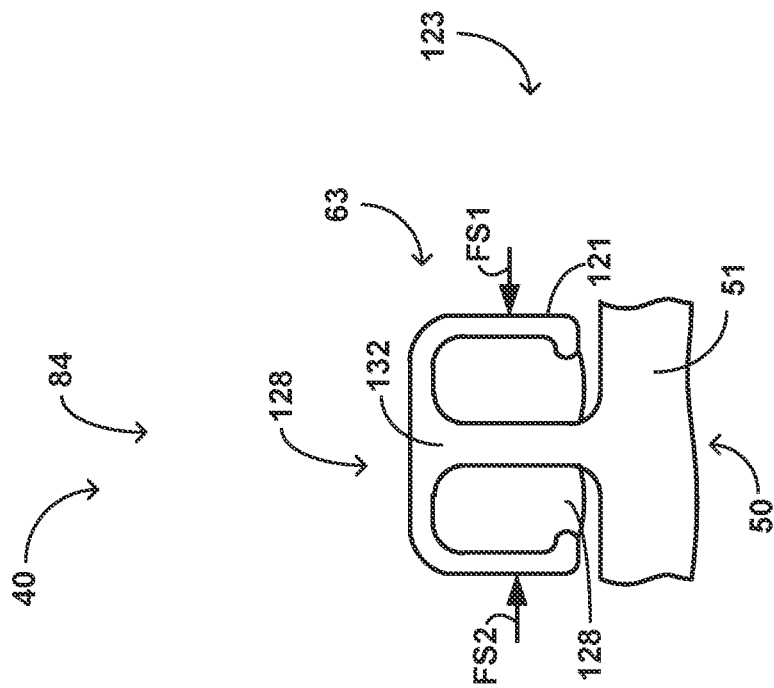
FIG. 13 is a cross-sectional schematic view of a seventh example of a first spline, the cross-section being taken in a direction orthogonal to a wheel axis.
Figure 12:
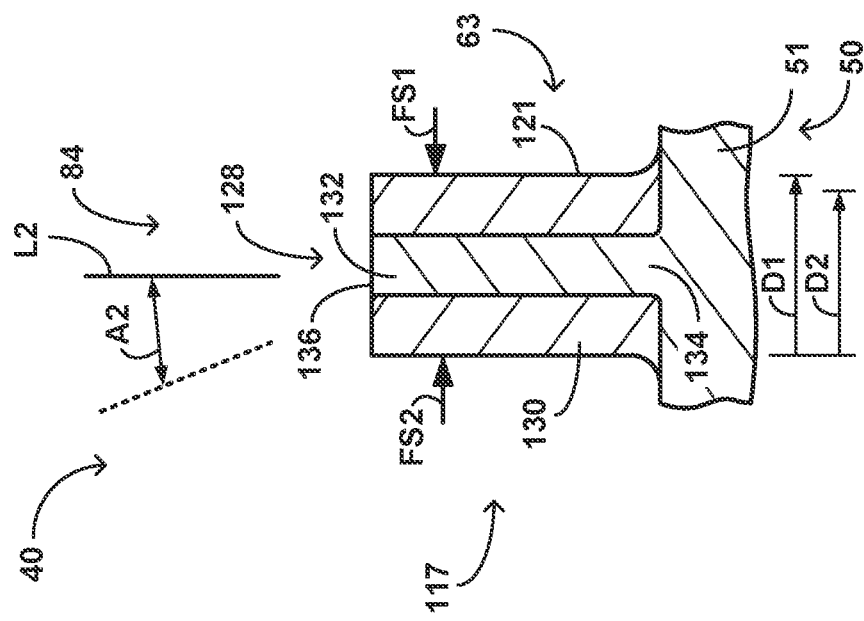
FIG. 12 is a cross-sectional schematic view of a sixth example of a first spline, the cross-section being taken in a direction orthogonal to a wheel axis.

For example, FIGS. 9-13 illustrate example first spline bodies including a first member 128 extending from torque tube body 51 and at least one second member 130 attached to first member 128. FIG. 9 illustrates first spline body 111, FIG. 10 illustrates first spline body 113, FIG. 11 illustrates first spline body 115, FIG. 12 illustrates first spline body 117, and FIG. 13 illustrates first spline body 123. First spline body 111, first spline body 113, first spline body 115, first spline body 117, and first spline body 123 are examples of first spline body 110. FIGS. 9-13 are schematic cross-sectional views illustrating first spline body 111, 113, 115, 117, 123 and a portion of torque tube 50 with the cross-section taken perpendicular to axis A (FIGS. 1-3). In some examples (e.g., as illustrated in FIGS. 9-11), first spline portion 120 and second spline portion 122 may define first member 128. In some examples (e.g., as illustrated in FIGS. 12 and 13, first member 128 may be a unitary spline portion 132 which extends radially outward from torque tube body 51.

First member 128 and second member 130 are configured such that a force (e.g., force FS1 or force FS2) imparted to first spline body 111, 113, 115, 117, 123 (e.g., by stator disc 60) is transmitted to both first member 128 and second member 130. In examples, both first member 128 and second member 130 are configured to deform (e.g., to bend and/compress) when the force is imparted to first spline body 111, 113, 114, 117, 123. The deformation of first member 128 and/or second member 130 in response to the force imparted on first spline body 111, 113, 114, 117, 123 may define the first stiffness of first spline body 111, 113, 115, 117, 123. Second member 130 may be attached to first member 128 using any suitable method which causes a force (e.g., force FS1 or force FS2) imparted to first spline body 111, 113, 114, 117, 123 to transmit to both first member 128 and second member 130. For example, second member 130 may be attached to first member 128 by welding, soldering, adhesives, using one or more fasteners, interference fitting, or other methods. Second member 130 may be configured to act as a structural member of first spline body 111, 113, 114, 117, 123, such that when stator disc 60 imparts a force (force FS1 or force FS2) to first spline body 111, 113, 114, 117, 123, second member 130 transfers at least a portion of the imparted force to first member 128 and/or receives at least a portion of the imparted force from first member 128.

In some examples, when first spline portion 120 and second spline portion 122 define first member 128 (e.g., as illustrated in FIGS. 9-11), second member 130 is positioned within some portion of a gap (e.g., gap G (FIG. 7)) separating first spline portion 120 and second spline portion 122. Second member 130 may be configured to act as a structural member of first spline body 111, 113, 114, 117, 123, such that a force on first spline portion 120 or second spline portion 122 is transmitted to other portions of first spline body 111, 113, 114, 117, 123. For example, first spline body 111, 113, 114, 117, 123 may be configured such that, when a force imparts to first spline portion 120 (e.g., force FS1), second member 130 transmits at least some portion of the force to second spline portion 122. First spline body 111, 113, 114, 117, 123 may be configured such that, when a force imparts to second spline portion 122 (e.g., force FS2), second member 130 transmits at least some portion of the force to first spline portion 120. In examples, First spline body 111, 113, 114, 117, 123 is configured such that first spline portion 120, second member 130, and second spline portion 122 deform (e.g., bend and/or compress) when stator disc 60 contacts and imparts a force (e.g., force FS1 or force FS2) on first spline body 111, 113, 114, 117, 123.

When first spline body 111, 113, 114, 117, 123 includes additional spline portions in addition to first spline portion 120 and/or second spline portion 122, second member 130 may be configured to transmit a force from and/or an additional spline portion to another spline portion (e.g., another additional spline portion, first spline portion 120, and/or second spline portion 122). For example, when first spline body 111, 113, 114, 117, 123 includes first spline portion 120, second spline portion 122, and additional spline portions, second member 130 may be interleaved with first spline portion 120, second spline portion 122, and the additional spline portions. In other examples, separate second members 130 can be positioned between directly adjacent spline portions.

In some examples, as illustrated in FIG. 11, second member 130 includes an outer member 138 and an inner member 140. In examples, at least some portion of outer member 138 and some portion of inner member 140 are configured to position within a gap (e.g., gap G (FIG. 7)) between first spline portion 120 and second spline portion 122. In some examples, outer member 138 is configured to reside between inner member 140 and first member 128 (e.g., first spline portion 120 and/or second spline portion 122) when outer member 138 and inner member 140 reside within the gap. Second member 130 may be configured such that a stiffness of second member 130 is dependent on a respective stiffness of outer member 138 and inner member 140, and/or a relative configuration of outer member 138 and inner member 140. For example, second member 130 may be configured such that a force imparted on second member 130 is transmitted to both outer member 138 and inner member 140, such that the response of both outer member 138 and inner member 140 defines the stiffness of second member 130 in response to the force. Outer member 138 and inner member 140 may be configured such that a force imparted to one or outer member 138 or inner member 140 is transmitted to the other of outer member 138 or inner member 140. Outer member 138 and/or inner member 140 may comprise, for example, a heat resistant steel such as Inconel or another steel. In some examples, inner member 140 may comprise a honeycomb-like structure and/or a structure having a different morphology.

In examples, outer member 138 is configured to line some portion of an inner surface 142 defined by first member 128 (e.g., defined by first spline portion 120 and/or second spline portion 122). Outer member 138 may be configured to define a cavity 144 (e.g., within gap G (FIG. 7)) in which inner member 140 at least partially resides. In examples, cavity 144 is a substantially open cavity defining an opening 146 (e.g., an opening which opens to an environment surrounding first spline body 115). In some examples, outer member 138 may define a substantially continuous boundary around cavity 144, such that cavity 144 is a closed cavity. In examples, outer member 138 is configured to extend axially (e.g., into or out of the page) along torque tube 50 to define cavity 144. Inner member 140 may be configured to insert within cavity 144 as a substantially unified solid member, or may be configured to insert within cavity 144 as a viscous material (e.g., to pour into cavity 144) intended to solidify once placed within cavity 144. In some examples, inner member 140 and/or outer member 138 may include a structure manufactured and/or fabricated using additive manufacturing techniques.

In some examples, for example, as illustrated in FIGS. 12-13, first member 128 includes a unitary spline portion 132 which extends radially outward from torque tube body 51. Unitary spline portion 132 may define a fixed end 134 supported by torque tube body 51 and a free end 136 opposite fixed end 134. Unitary spline portion 132 is configured to deform (e.g., bend and/or compress) when stator disc 60 imparts force FS1. For example, unitary spline portion 132 may be configured such that a spline axis L2 extending through fixed end 134 and free end 136 has a first orientation with respect to torque tube body 51 when torque tube 50 is in an unloaded condition (e.g., as depicted at FIG. 4).

Unitary spline portion 132 may be configured to bend when stator disc 60 imparts force FS1 or force FS2 on first spline body 110 (e.g., first spline body 117, 123), such that spline axis L2 has a second orientation with respect to torque tube body 51 different from the first orientation. For example, unitary spline portion 132 may be configured to bend to cause spline axis L2 to angularly displace by an angle A2 when stator disc 60 imparts force FS1 on first spline body 110 (e.g., first spline body 117, 123) and causes spline axis L2 to transition between the first orientation and the second orientation. In examples, unitary spline portion 132 is configured to bend to cause free end 136 to move relative to fixed end 134 when stator disc 60 imparts force FS1 or force FS2 on first spline body 110 (e.g., first spline body 117, 123). First spline body 110 (e.g., first spline body 117, 123) may be configured such that, when a force imparts to second member 130 (e.g., force FS1 or force FS2), second member 130 transmits at least some portion of the force to unitary spline portion 132. In examples, first spline body 110 (e.g., first spline body 117, 123) is configured such that second member 130 and unitary spline portion 132 deform (e.g., bend and/or compress) when stator disc 60 contacts and imparts a force (e.g., force FS1 or force FS2) on second member 130.

In some examples, first spline body 110, 111, 113, 115, 117, 123 is configured to deform by compression when stator disc 60 imparts force FS1 or force FS2 to first spline body 110, 111, 113, 115, 117, 123. In some examples, first member 128 and/or second member 130 is configured to deform by compression when stator disc 60 imparts force FS1 or force FS2 to first spline body 110, 111, 113, 115, 117, 123. For example, as depicted in FIG. 12, first spline body 117 may define a first displacement D1 when torque tube 50 is in a substantially unloaded condition (e.g., substantially unloaded by a torque imparted from stator disc 60). First spline body 117 may be configured to compress to define a second displacement D2 less than the displacement D1 when stator disc 60 imparts the force FS1 (FIG. 5) or force FS2 (FIG. 6) to first spline body 117, with displacement D2 less than displacement D1. The compression of first spline body 117 may absorb some portion of the kinetic energy of stator disc 60 as stator disc 60 contacts first spline body 117. First spline body 117 may continue to compress while exerting first reaction force FR1 or first reaction force FR3 against stator disc 60 as stator disc 60 subsequently makes contact with and begins to impart a force to second spline 64, 88, 94 (FIGS. 3-6). The initial absorption of kinetic energy through compression of first spline body 117 may reduce first reaction force FR1 and/or first reaction force FR3 (and e.g., second reaction force FR2 and/or second reaction force FR4) that might have otherwise occurred in the absence of the compression of first spline body 110. For example, when stator disc 60 dynamically loads torque tube body 51 by imparting an impulse (e.g., a force profile over a given time), compression of first spline body 117 may reduce a first reaction force imparted by first spline body 117 or a second reaction force imparted by second spline 64, 88, 94 during an initial phase of the impulse, when the force profile of the impulse may result in stator disc 60 imparting higher forces to torque tube body 51 (e.g., during initial contact between stator disc 60 and torque tube body 51). Hence, the compression of first spline body 117 may act to reduce higher stresses that might otherwise occur, such as during a dynamic loading (e.g., an impact loading and/or other loading) when stator disc 60 imparts an abrupt and/or uneven load to first spline body 117 and/or second spline 64, 88, 94.

In examples, second member 130 is configured to compress when stator disc 60 imparts the force FS1 (FIG. 5) or force FS2 (FIG. 6) to first spline body 110, 111, 113, 115, 117, 123. In some examples, first member 128 is configured to compress when stator disc 60 imparts the force FS1 (FIG. 5) or force FS2 (FIG. 6) to first spline body 110, 111, 113, 115, 117, 123. In examples, first member 128 and second member 130 is configured to compress when stator disc 60 imparts the force FS1 (FIG. 5) or force FS2 (FIG. 6) to first spline body 110, 111, 113, 115, 117, 123. Any of first spline body 110, 113, 115, 117, 123 may be configured to deform by compression from the displacement D1 to the displacement D2 when stator disc 60 imparts force FS1 or force FS2 to first spline body 110, 111, 113, 115, 117, 123.

In examples (e.g., FIG. 9 and FIG. 13), first spline body 111, 113, 115, 117, 123 is configured such that at least some portion of first member 128 receives the force (e.g., force FS1 or force FS2) from stator disc 60 and transmits some portion of the force received to second member 130. First spline body 111, 113, 115, 117, 123 may be configured such that first member 128 contacts stator disc 60 prior to second member 130 contacting stator disc 60 when stator disc 60 moves relative to torque tube body 51. In some examples (e.g., FIGS. 10-12), first spline body 111, 113, 115, 117, 123 is configured such that at least some portion of second member 130 receives the force (e.g., force FS1 or force FS2) from stator disc 60 and transmits some portion of the force received to first member 128. First spline body 111, 113, 115, 117, 123 may be configured such the second member 130 remains between first member 128 and stator disc 60 when stator disc 60 contacts first spline 163. First member 128 may be configured to deform when second member 130 transmits the portion of the force from stator disc 60 to second member 130.

First member 128 and second member 130 may have any suitable densities and any suitable stiffnesses relative to each other. In examples, first member 128 comprises a first material having a first density and second member 130 comprises a second material having a second density less than the first density. In other example, the first density may be less than the second density. In some examples, second member 130 (e.g., inner member 140 and/or outer member 138) comprises a porous material (e.g., a material defining a network of pores or voids). In some examples, inner member 140 (FIG. 11) comprises a porous material and outer member 138 comprises a substantially non-porous material.

In some examples, at least some portion of first spline 63 (e.g., first component 128) is a substantially integral portion of torque tube body 51, such that first component 128 and torque tube body 51 define a contiguous material extending from torque tube body 51 to first component 128. For example, first component 128 may be a portion of torque tube body 51 fabricated by machining torque tube 50 to form first component 128 (e.g., such that first component 128 is substantially inseparable from torque tube body 51 absent further machining such as cutting or grinding). In some examples, at least first component 128 is configured to physically separate from torque tube body 51 and subsequently joined and/or attached to torque tube body 51.

Figure 14:
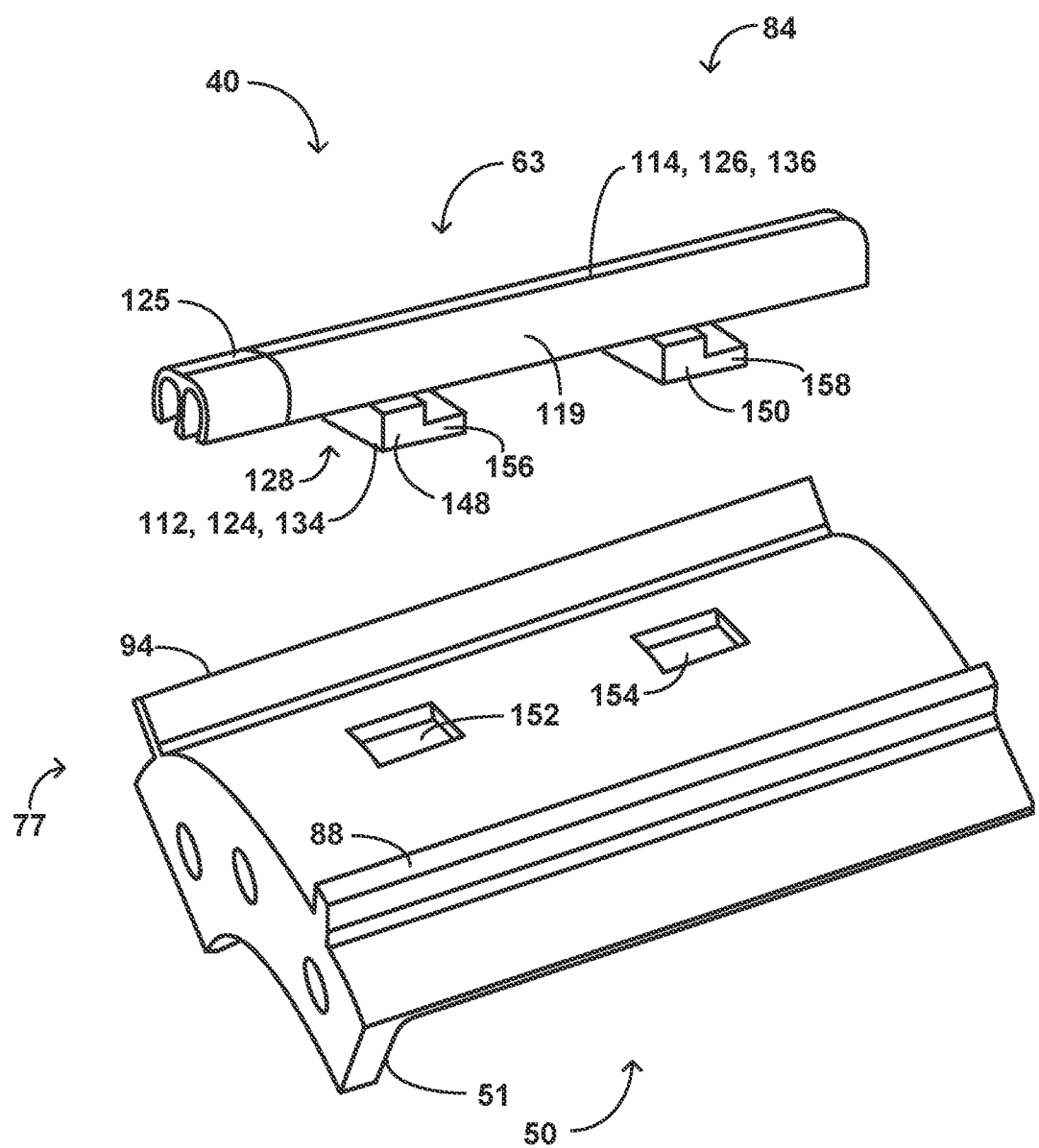
FIG. 14 is a perspective view of a first spline configured to attach to a torque tube.

For example, FIG. 14 illustrates a schematic perspective view of an example first spline body 125 configured to attach to an example torque tube body 51. First spline body 125 is an example of first spline body 110, 111, 113, 115, 117, 123. In examples, one of first spline body 125 or torque tube body 51 defines a protrusion and the other of first spline body 125 or torque tube body 51 defines a recess configured to receive the protrusion. In some examples, first spline body 125 is configured to attach to torque tube body 51 when the recess receives the protrusion. In some examples, first member 128 of first spline body 125 defines the protrusion or the recess. In examples, first spline body 125 is configured to define fixed end 112, 124, 134 when the recess receives the protrusion. First spline body 125 may define free end 114, 126, 136 when the recess receives the protrusion.

In examples, the protrusion is configured to limit movement of first spline body 125 relative to torque tube body 51 in a radial direction and/or tangential direction of torque tube 50 when the protrusion inserts into the recess. For example, the protrusion may be configured to limit movement of first spline body 125 in a radial direction such as a direction of the first radius R1 or the second radius R2 (FIG. 4). The protrusion may be configured to limit first spline body 125 in a tangential direction perpendicular to the first radius R1 or first radius R2 and perpendicular to axis A (e.g., perpendicular or nearly perpendicular to first radius R1 or second radius R2 and perpendicular or nearly perpendicular axis A to the extent permitted by manufacturing tolerances).

First spline body 125 can include one or more structural features configured to engage torque tube body 51 in order to mechanically connect first spline body 125 to torque tube body 51. For example, first spline body 125 can define one or more feet such as foot 148 and/or foot 150. Foot 148, 150 may be configured to insert into torque tube body 51 to hold first spline body 125 substantially stationary with respect to torque tube body 51. Foot 148, 150 may be configured such that when the foot is used to attach spline body 125 to torque tube body 51, first spline body 125 transmits a torque to torque tube body 51 when stator disc 60 transmits a torque to first spline body 125. In examples, torque tube body 51 defines one or more recesses such as recess 152 and/or recess 154 configured to receive foot 148 and/or foot 150. Foot 148, 150 may be configured to slidably engage torque tube body 51 to hold first spline body 125 substantially stationary with respect to torque tube body 51. For example, first spline body 125 may be configured such that foot 148, 150 may be inserted into recess 152, 154. With foot 148, 150 inserted into recess 152, 154, first spline 63 may be configured such that movement (e.g., movement substantially parallel to axis A (FIGS. 1-3)) of first spline body 125 relative to torque tube body 51 causes foot 148, 150 to slidable engage torque tube body 51. Foot 148, 150 may be configured to limit movement of first spline body 125 relative to torque tube body 51 in the radial direction of torque tube 50 and/or the tangential direction of torque tube 50 when foot 148, 150 inserts into recess 152, 154.

Figure 15:
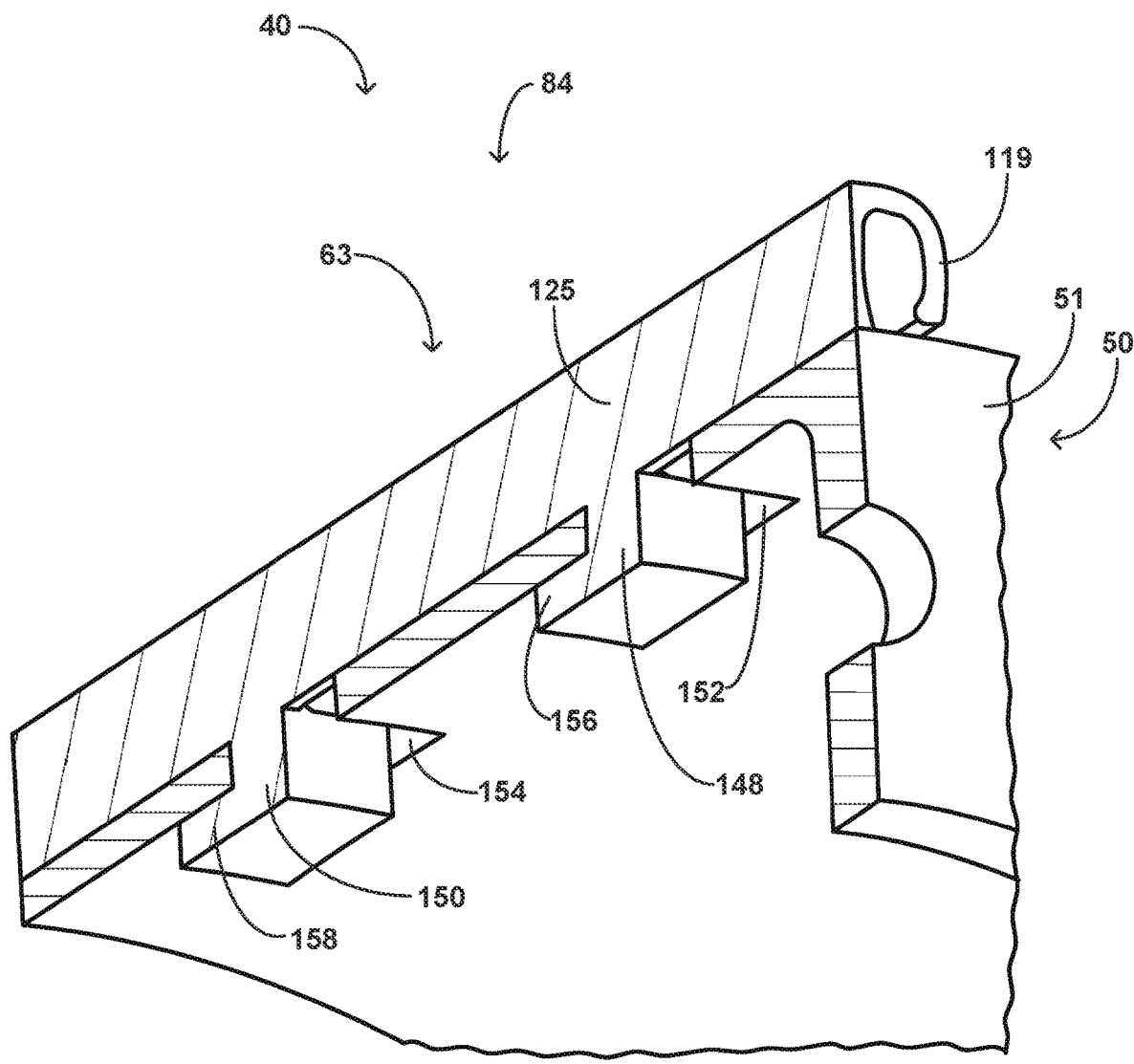
FIG. 15 is a perspective cross-sectional view of the first spline of FIG. 14 attached to the torque tube of FIG. 14, the cross-section being taken in a direction orthogonal to a wheel axis.

As an example, FIG. 15 is a perspective, cross-sectional illustration of first spline body 125 with foot 148 inserted into recess 152 and foot 150 inserted into recess 154. Foot 148 may define a flange 156 and/or foot 150 may define a flange 158 configured to slidably engage torque tube body 51. Flange 156, 158 may be configured such that flange 156, 158 traps some portion of torque tube body 51 between flange 156,158 and another portion of spline body 125 to limit movement of first spline body 125 relative to torque tube body 51 (e.g., limit movement of first spline body 125 relative to torque tube body 51 in the radial direction of torque tube 50 and/or the tangential direction of torque tube 50).

First spline body 125 may be affixed to torque tube 50 (e.g., torque tube body 51) by welding, soldering, fasteners, adhesives, and/or other fixation methods in addition to or instead of a protrusion or a recess defined by first spline body 125.

First spline 63, 90, 92, second spline 63, 90, 92, torque tube 50, stator disc 60, 61, 62, other components of brake assembly 40, wheel 10, and the components thereof, may be made from any suitable material. For example, the material may be any material of suitable strength for the intended use of first spline 63, 90, 92, second spline 63, 90, 92, torque tube 50, stator disc 60, 61, 62, other components of brake assembly 40, wheel 10, and the components thereof. In some examples, the material includes a metal or a metal alloy. First spline 63, 90, 92, second spline 63, 90, 92, torque tube 50, stator disc 60, 61, 62, other components of brake assembly 40, wheel 10, and the components thereof, can be formed using any suitable technique. First spline 63, 90, 92, second spline 63, 90, 92, torque tube 50, stator disc 60, 61, 62, other components of brake assembly 40, wheel 10, and the components thereof, may be forged, casted, made from bar stock, additive manufactured (e.g., three-dimensionally (3D) printed), extruded, drawn, or be produced using other suitable methods. In some examples, first spline 63, 90, 92, second spline 63, 90, 92, torque tube 50, stator disc 60, 61, 62, other components of brake assembly 40, wheel 10, and the components thereof, may be machined to define the configurations described herein. In other examples, First spline 63, 90, 92, second spline 63, 90, 92, torque tube 50, stator disc 60, 61, 62, other components of brake assembly 40, wheel 10, and the components thereof may be formed without having to be substantially machined.

Wheel 10 may be finish machined from a near-net-shaped aluminum forging and contain an axial assembly and/or wheel rim for assembly of brake system 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including stator discs 60, 61, 62 and rotor discs 54, 55, 56, 57, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multi-layer structure.

Figure 16:
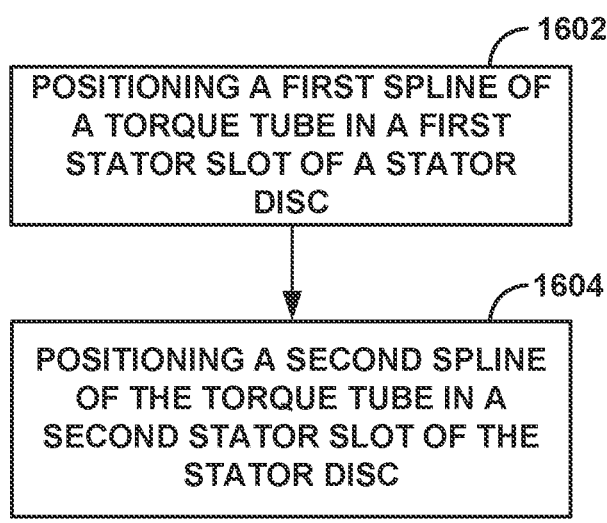
FIG. 16 is a flow diagram illustrating an example method of positioning a torque tube defining a first spline and a second spline.

FIG. 16 illustrates a flow diagram of an example technique for positioning a stator disc on a torque tube. Although the technique is mainly described with reference brake assembly 40 and the components thereof (FIGS. 2-15), the technique may be used with other cooling systems in other examples.

The technique includes positioning a torque tube 50 (e.g., torque tube body 51) through an aperture 72 defined by a stator disc 60, 61, 62. Positioning torque tube 50 through aperture 72 includes positioning a first spline 63, 90, 92 extending from torque tube body 51 in a first stator slot 78, 91, 93 of stator disc 60, 61, 62 (1602). Positioning torque tube 50 through aperture 72 includes positioning a second spline 64, 88, 94 extending from torque tube body 51 in a second stator slot 80, 89, 95 of stator disc 60, 61, 62 (1604). Stator disc 60, 61, 62 may define first stator slot 78, 91, 93 and/or second stator slot 80, 89, 95 on an inner perimeter 74 of stator disc 60. Inner perimeter 74 may define aperture 72. In examples, the technique includes positioning torque tube 50 through one or more apertures defined by rotor disc 54, 55, 56, 57. One or more of rotor discs 54, 55, 56, 57 may interleave with one or more of stator disc 60, 62, 62 when torque tube 50 positions through the one or more apertures.

In examples, positioning torque tube 50 through aperture 72 includes moving stator disc 60, 61, 62 relative to torque tube body 51 in an axial direction of torque tube 50 (along axis A). In examples, positioning first spline 63, 90, 92 in first stator slot 78, 91, 93 includes moving stator disc 60, 61, 62 over first spline 63, 90, 92 axially along torque tube body 51. Positioning second spline 64, 88, 94 in second stator slot 80, 89, 95 may include moving stator disc 60, 61, 62 over second spline 64, 88, 94 axially along torque tube body 51. In examples, positioning torque tube 50 through aperture 72 includes positioning first spline 63, 90, 92 in first stator slot 78, 91, 93 as second spline 64, 88, 94 positions in second stator slot 80, 89, 95. In some examples, positioning torque tube 50 through aperture 72 includes attaching stator insert 86 to on or more of stator slots 77 prior to positioning torque tube 50 through aperture 72.

Positioning torque tube 50 through aperture 72 includes positioning first spline 63, 90, 92 in first stator slot 78, 91, 93 and positioning second spline 64, 88, 94 such that first spline 63, 90, 92 and second spline 64, 88, 94 limit rotational movement of stator disc 60, 61, 62 around torque tube body 51 when torque tube 50 is positioned through aperture 72. First spline 63, 90, 92 and second spline 64, 88, 94 may limit a rotation movement of stator disc 60, 61, 62 around torque tube body 51 when a torque T1 and/or a torque T2 is exerted on stator disc 60, 61, 62 (e.g., by engagement with rotor disc 54, 55, 56, 57). Stator disc 60, 61, 62 may impart a force FS1 or force FS3 on first spline 63, 90, 92 when torque T1 or torque T2 respectively is exerted on stator disc 60, 61, 62. Stator disc 60, 61, 62 may impart a force FS2 or force FS4 on second spline 64, 88, 94 when torque T1 or torque T2 respectively is exerted on stator disc 60, 61, 62. First spline 63, 90, 92 may exert a first reaction force FR1 or FR3 on stator disc 60, 61, 62 and/or second spline second spline 64, 88, 94 may exert a second reaction force FR2 or second reaction force FR4 on stator disc 60, 61, 62 when stator disc 60, 61, 62 imparts one or more forces (e.g., force FS1, force FS2, force FS3, and/or force FS4) to first spline 63, 90, 92 and/or second spline second spline 64, 88, 94.

First spline 63, 90, 92 may contact stator disc 60, 61, 62 prior to second spline 64, 88, 94 when first spline 63, 90, 92 and second spline 64, 88, 94 limit the rotational movement of stator disc 60, 61, 62 around torque tube body 51. For example, first spline 63, 90, 92 may deform (e.g., bend or compress) when stator disc 60, 61, 62 contacts first spline 63, 90, 92. The deformation of first spline 63, 90, 92 prior to stator disc 60, 61, 62 may absorb some portion of the kinetic energy and/or momentum of stator disc 60, 61, 62 prior to stator disc 60, 61, 62 contacting second spline 64, 88, 94, reducing first reaction force FR1 or FR3 and/or second reaction force FR2 and/or second reaction force FR4. First spline 63, 90, 92 may have a first stiffness causing first spline 63, 90, 92 to resist a deformation caused by forces (e.g., force FS1 or force FS3) imparted from stator disc 60, 61, 62 to first spline 63, 90, 92. Second spline 64, 88, 94 may have a second stiffness causing second spline 64, 88, 94 to resist a deformation caused by forces (e.g., force FS2 or force FS4) imparted from stator disc 60, 61, 62 to second spline 64, 88, 94. The second stiffness may be greater than the first stiffness when stator disc 60, 62, 62 imparts the forces to first spline 63, 90, 92 and/or second spline 64, 88, 94.

The present disclosure includes the following examples.

Example 1: A brake assembly comprising: a torque tube defining a wheel axis of a wheel, wherein the torque tube comprises a body and is configured to extend through an aperture defined by a stator disc; a first spline extending from the body of the torque tube; a second spline extending from the body of the torque tube, wherein the first spline and the second spline are configured to contact the stator disc to limit rotational movement of the stator disc relative to the torque tube when the torque tube extends through the aperture, wherein the first spline has a first stiffness and the second spline has a second stiffness greater than the first stiffness, and wherein the first spline is configured to contact the stator disc prior to the second spline contacting the stator disc when the stator disc rotates relative to the torque tube and the torque tube extends through the central aperture.

Example 2: The brake assembly of example 1, wherein the first stiffness is a first bending stiffness and wherein the second stiffness is a second bending stiffness.

Example 3: The brake assembly of example 1 of example 2, wherein the first spline includes a fixed end attached to the torque tube and a free end opposite the fixed end, and wherein the first spline is configured to bend such that the free end moves relative to the fixed end when the first spline contacts the stator disc and the stator disc exerts a force on the first spline.

Example 4: The brake assembly of any of examples 1-3, wherein the first spline is configured to increase a contact area with the stator disc when the stator disc exerts the force on the first spline and the first spline bends.

Example 5: The brake assembly of any of examples 1-4, wherein the first spline is configured to contact the stator disc prior to the second spline contacting the stator disc when the stator disc rotates relative to the torque tube in a first rotational direction or in a second rotational direction opposite the first rotational direction.

Example 6: The brake assembly of any of examples 1-5, wherein the first spline extends from the body of the torque tube in a first radial direction from the axis of the wheel, and wherein the second spline extends from the body of the torque tube in a second radial direction from the axis of the wheel, the first radial direction being different from the second radial direction.

Example 7: The brake assembly of any of examples 1-6, wherein the first spline and the second spline are configured to allow the stator disc to translate in an axial direction over the torque tube when the stator disc surrounds the torque tube, and wherein the axial direction is substantially parallel to the wheel axis of the wheel.

Example 8: The brake assembly of any of examples 1-7, wherein the first spline includes a first member extending from the torque tube and a second member attached to the first member, and wherein the first member has a first member stiffness and the second member has a second member stiffness less than the first stiffness.

Example 9: The brake assembly of example 8, wherein at least a portion of the first member is between at least a portion of the second member and the stator disc when the first spline contacts the stator disc.

Example 10: The brake assembly of example 8 or example 9, wherein at least a portion of the second member is between at least a portion of the first member and the stator disc when the first spline contacts the stator disc.

Example 11: The brake assembly of any of examples 1-10, wherein the first spline comprises a first spline portion extending radially outward from the body of the torque tube and a second spline portion extending radially outward from the body of the torque tube, and wherein the first spline portion is separated from the second spline portion by a gap.

Example 12: The brake assembly of any of examples 1-11, wherein the first spline is configured to experience a first amount of deflection relative to the torque tube when the first spline contacts the stator disc and the stator disc exerts a specific magnitude of force on the first spline, wherein the second spline is configured to experience a second amount of deflection relative to the torque tube when the second spline contacts the stator disc and the stator disc exerts the specific magnitude of force on the second spline, and wherein the first amount of deflection is greater than the second amount of deflection.

Example 13: The brake assembly of any of examples 1-12, further comprising a plurality of stator discs, wherein the plurality of stator discs includes the stator disc, wherein the second spline is configured to contact each stator disc of the plurality of stator discs to limit rotational movement of the plurality of stator discs relative to the torque tube, and wherein the first spline is configured to contact the each stator disc of the plurality of stator discs prior to the second spline contacting the each stator disc to limit rotational movement of the plurality of stator discs relative to the torque tube.

Example 14: The brake assembly of example 13, wherein each stator disc of the plurality of stator discs defines a central stator aperture, wherein the aperture is one or more of the central stator apertures, and wherein the torque tube extends through each central stator aperture of the plurality of stator discs.

Example 15: The brake assembly of example 13 or example 14, further comprising a plurality of rotor discs interleaved with the plurality of stator discs, wherein the plurality of rotor discs are configured to rotate around the wheel axis when the wheel rotates around the wheel axis, wherein the plurality of rotor discs are configured to frictionally engage the plurality of stator discs, and wherein the stator disc is configured rotate relative to the torque tube to contact the first spline and the second spline when the plurality of rotor discs frictionally engage the plurality of stator discs.

Example 16: A brake assembly comprising: a torque tube defining a wheel axis of a wheel, wherein the torque tube is configured to extend through an aperture defined by a stator disc; a compliant spline extending from a body of the torque tube in a first radial direction from the axis of the wheel; and a stiff spline extending from the body of the torque tube in a second radial direction from the axis of the wheel, wherein the second radial direction is different from the first radial direction, wherein the compliant spline and the stiff spline are configured to contact the stator disc to limit rotational movement of the stator disc relative to the torque tube when the torque tube extends through the aperture, wherein the compliant spline is configured to contact the stator disc prior to the stiff spline contacting the stator disc when the stator disc rotates relative to the torque tube and the torque tube extends through the aperture, wherein the compliant spline is configured to experience a first amount of deflection relative to the torque tube when the compliant spline contacts the stator disc and the stiff spline is configured to experience a second amount of deflection relative to the torque tube when the stiff spline contacts the stator disc, and wherein the first amount of deflection is greater than the second amount of deflection.

Example 17: The brake assembly of example 16, wherein the stiff spline is configured to allow the stator disc to translate in an axial direction over the torque tube when the stator disc surrounds the torque tube, wherein the compliant spline is configured to allow the stator disc to translate in the axial direction over the torque tube when the stator disc surrounds the torque tube, and wherein the axial direction is substantially parallel to the wheel axis of the wheel.

Example 18: The brake assembly of example 16 or example 17, further comprising a plurality of stator discs, wherein the plurality of stator discs includes the stator disc; wherein the stiff spline is configured to contact each stator disc of the plurality of stator discs to limit rotational movement of the plurality of stator discs relative to the torque tube, and wherein the compliant spline is configured to contact the each stator disc of the plurality of stator discs prior to the stiff spline contacting the each stator disc to limit rotational movement of the plurality of stator discs relative to the torque tube.

Example 19: A method, comprising: positioning a torque tube through an aperture defined by a stator disc, the torque tube defining a wheel axis of a wheel and comprising a body, wherein positioning the torque tube through the aperture comprises: positioning a first spline in a first stator slot defined by the stator disc, the first spline extending from the body of the torque tube; and positioning a second spline in a second stator slot defined by the stator disc, the second spline extending from the body of the torque tube, wherein the first spline and the second spline are configured to contact the stator disc to limit rotational movement of the stator disc relative to the torque tube when the torque tube extends through the aperture, wherein the first spline has a first stiffness and the second spline has a second stiffness greater than the first stiffness, and wherein the first spline is configured to contact the stator disc prior to the second spline contacting the stator disc when the stator disc rotates relative to the torque tube and the torque tube extends through the aperture.

Example 20: The method of example 19, wherein the stator disc is configured to deflect the first spline by at least moving a free end of the first spline relative to a fixed end of the first spline, wherein the fixed end is attached to the torque tube and the free end is opposite the fixed end.

Various examples have been described. These and other examples are within the scope of the following claims.

What is claimed is:

1. A brake assembly comprising:
a torque tube defining a wheel axis of a wheel, wherein the torque tube comprises a body and is configured to extend through an aperture defined by a stator disc;
a first spline extending from the body of the torque tube; and
a second spline extending from the body of the torque tube,
wherein the first spline and the second spline are configured to contact the stator disc to limit rotational movement of the stator disc relative to the torque tube when the torque tube extends through the aperture,
wherein the first spline has a first stiffness and the second spline has a second stiffness greater than the first stiffness, and
wherein the first spline is configured to contact the stator disc prior to the second spline contacting the stator disc when the stator disc rotates relative to the torque tube and the torque tube extends through the aperture.

2. The brake assembly of claim 1, wherein the first stiffness is a first bending stiffness and wherein the second stiffness is a second bending stiffness.

3. The brake assembly of claim 1,
wherein the first spline includes a fixed end attached to the torque tube and a free end opposite the fixed end, and
wherein the first spline is configured to bend such that the free end moves relative to the fixed end when the first spline contacts the stator disc and the stator disc exerts a force on the first spline.

4. The brake assembly of claim 3, wherein the first spline is configured to increase a contact area with the stator disc when the stator disc exerts the force on the first spline and the first spline bends.

5. The brake assembly of claim 1, wherein the first spline is configured to contact the stator disc prior to the second spline contacting the stator disc when the stator disc rotates relative to the torque tube in a first rotational direction or in a second rotational direction opposite the first rotational direction.

6. The brake assembly of claim 1, wherein the first spline extends from the body of the torque tube in a first radial direction from the wheel axis of the wheel, and wherein the second spline extends from the body of the torque tube in a second radial direction from the axis of the wheel, the first radial direction being different from the second radial direction.

7. The brake assembly of claim 1,
wherein the first spline and the second spline are configured to allow the stator disc to translate in an axial direction over the torque tube when the stator disc surrounds the torque tube, and
wherein the axial direction is substantially parallel to the wheel axis of the wheel.

8. The brake assembly of claim 1,
wherein the first spline includes a first member extending from the torque tube and a second member attached to the first member, and
wherein the first member has a first member stiffness and the second member has a second member stiffness less than the first stiffness.

9. The brake assembly of claim 8, wherein at least a portion of the first member is between at least a portion of the second member and the stator disc when the first spline contacts the stator disc.

10. The brake assembly of claim 8, wherein at least a portion of the second member is between at least a portion of the first member and the stator disc when the first spline contacts the stator disc.

11. The brake assembly of claim 1,
wherein the first spline comprises a first spline portion extending radially outward from the body of the torque tube and a second spline portion extending radially outward from the body of the torque tube, and
wherein the first spline portion is separated from the second spline portion by a gap.

12. The brake assembly of claim 1,
wherein the first spline is configured to experience a first amount of deflection relative to the torque tube when the first spline contacts the stator disc and the stator disc exerts a specific magnitude of force on the first spline,
wherein the second spline is configured to experience a second amount of deflection relative to the torque tube when the second spline contacts the stator disc and the stator disc exerts the specific magnitude of force on the second spline, and
wherein the first amount of deflection is greater than the second amount of deflection.

13. The brake assembly of claim 1, further comprising a plurality of stator discs,
wherein the plurality of stator discs includes the stator disc,
wherein the second spline is configured to contact each stator disc of the plurality of stator discs to limit rotational movement of the plurality of stator discs relative to the torque tube, and
wherein the first spline is configured to contact the each stator disc of the plurality of stator discs prior to the second spline contacting the each stator disc to limit rotational movement of the plurality of stator discs relative to the torque tube.

14. The brake assembly of claim 13, wherein each stator disc of the plurality of stator discs defines a central stator aperture, wherein the aperture is one or more of the central stator apertures, and wherein the torque tube extends through each central stator aperture of the plurality of stator discs.

15. The brake assembly of claim 13, further comprising a plurality of rotor discs interleaved with the plurality of stator discs,
wherein the plurality of rotor discs are configured to rotate around the wheel axis when the wheel rotates around the wheel axis,
wherein the plurality of rotor discs are configured to frictionally engage the plurality of stator discs, and
wherein the stator disc is configured rotate relative to the torque tube to contact the first spline and the second spline when the plurality of rotor discs frictionally engage the plurality of stator discs.

16. A brake assembly comprising:
a torque tube defining a wheel axis of a wheel, wherein the torque tube is configured to extend through an aperture defined by a stator disc;
a compliant spline extending from a body of the torque tube in a first radial direction from the wheel axis of the wheel; and
a stiff spline extending from the body of the torque tube in a second radial direction from the axis of the wheel, wherein the second radial direction is different from the first radial direction,
wherein the compliant spline and the stiff spline are configured to contact the stator disc to limit rotational movement of the stator disc relative to the torque tube when the torque tube extends through the aperture,
wherein the compliant spline is configured to contact the stator disc prior to the stiff spline contacting the stator disc when the stator disc rotates relative to the torque tube and the torque tube extends through the aperture,
wherein the compliant spline is configured to experience a first amount of deflection relative to the torque tube when the compliant spline contacts the stator disc and the stiff spline is configured to experience a second amount of deflection relative to the torque tube when the stiff spline contacts the stator disc, and
wherein the first amount of deflection is greater than the second amount of deflection.

17. The brake assembly of claim 16,
wherein the stiff spline is configured to allow the stator disc to translate in an axial direction over the torque tube when the stator disc surrounds the torque tube,
wherein the compliant spline is configured to allow the stator disc to translate in the axial direction over the torque tube when the stator disc surrounds the torque tube, and
wherein the axial direction is substantially parallel to the wheel axis of the wheel.

18. The brake assembly of claim 16, further comprising a plurality of stator discs, wherein the plurality of stator discs includes the stator disc;
wherein the stiff spline is configured to contact each stator disc of the plurality of stator discs to limit rotational movement of the plurality of stator discs relative to the torque tube, and
wherein the compliant spline is configured to contact the each stator disc of the plurality of stator discs prior to the stiff spline contacting the each stator disc to limit rotational movement of the plurality of stator discs relative to the torque tube.

19. A method, comprising:
positioning a torque tube through an aperture defined by a stator disc, the torque tube defining a wheel axis of a wheel and comprising a body, wherein positioning the torque tube through the aperture comprises:
positioning a first spline in a first stator slot defined by the stator disc, the first spline extending from the body of the torque tube; and positioning a second spline in a second stator slot defined by the stator disc, the second spline extending from the body of the torque tube, wherein the first spline and the second spline are configured to contact the stator disc to limit rotational movement of the stator disc relative to the torque tube when the torque tube extends through the aperture, wherein the first spline has a first stiffness and the second spline has a second stiffness greater than the first stiffness, and wherein the first spline is configured to contact the stator disc prior to the second spline contacting the stator disc when the stator disc rotates relative to the torque tube and the torque tube extends through the aperture.

20. The method of claim 19, wherein the stator disc is configured to deflect the first spline by at least moving a free end of the first spline relative to a fixed end of the first spline, wherein the fixed end is attached to the torque tube and the free end is opposite the fixed end.

* * * * *